(12) United States Patent
Dickins et al.

(10) Patent No.: US 10,224,046 B2
(45) Date of Patent: Mar. 5, 2019

(54) SPATIAL COMFORT NOISE

(71) Applicants: DOLBY LABORATORIES LICENSING CORPORATION, San Francisco, CA (US); DOLBY INTERNATIONAL AB, Amsterdam Zuidoost (NL)

(72) Inventors: Glenn N. Dickins, Como (AU); Xuejing Sun, Beijing (CN); Yen-Liang Shue, Kensington (AU); Heiko Purnhagen, Sundyberg (SE)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 397 days.

(21) Appl. No.: 14/774,966

(22) PCT Filed: Mar. 4, 2014

(86) PCT No.: PCT/US2014/020239
§ 371 (c)(1),
(2) Date: Sep. 11, 2015

(87) PCT Pub. No.: WO2014/143582
PCT Pub. Date: Sep. 18, 2014

(65) Prior Publication Data
US 2016/0027447 A1    Jan. 28, 2016

Related U.S. Application Data

(60) Provisional application No. 61/807,417, filed on Apr. 2, 2013.

(30) Foreign Application Priority Data

Mar. 14, 2013   (CN) .......................... 2013 1 0081933

(51) Int. Cl.
*G10L 19/012*   (2013.01)
*H04L 12/18*   (2006.01)
(Continued)

(52) U.S. Cl.
CPC ........ *G10L 19/012* (2013.01); *G10L 21/0208* (2013.01); *H04L 12/1813* (2013.01);
(Continued)

(58) Field of Classification Search
CPC . G10L 19/012; G10L 21/0208; G10L 19/008; H04M 3/568; H04M 3/56; H04L 12/1827; H04L 12/1813
(Continued)

(56) References Cited

U.S. PATENT DOCUMENTS 6,882,971 B2   4/2005   Craner
6,931,123 B1   8/2005   Hughes
(Continued)

FOREIGN PATENT DOCUMENTS

WO   99/53673   10/1999
WO   2012/109384   8/2012

OTHER PUBLICATIONS

Bormann, Karsten "Presence and the Utility of Audio Spatialization" vol. 14, Issue 3, pp. 278-297, Jun. 2005, MIT Press.
(Continued)

*Primary Examiner* — Bharatkumar S Shah

(57) ABSTRACT

A method, an apparatus, logic (e.g., executable instructions encoded in a non-transitory computer-readable medium to carry out a method), and a non-transitory computer-readable medium configured with such instructions. The method is to generate and spatially render spatial comfort noise at a receiving endpoint of a conference system, such that the comfort noise has target spectral characteristics typical of comfort noise, and at least one spatial property that at least
(Continued)

substantially matches at least one target spatial property. On version includes receiving one or more or more audio signals from other endpoints, combining the received audio signals with the spatial comfort noise signals, and rendering the combination of the received audio signals and the spatial comfort noise signals to a set of output signals for loudspeakers, such that the spatial comfort noise signals are continually in the output signal sin addition to output from the received audio signals.

5 Claims, 10 Drawing Sheets

(51) Int. Cl.
G10L 21/0208 (2013.01)
H04M 3/56 (2006.01)
G10L 19/008 (2013.01)

(52) U.S. Cl.
CPC ........ H04L 12/1827 (2013.01); H04M 3/568 (2013.01); G10L 19/008 (2013.01)

(58) Field of Classification Search
USPC ........................................................ 704/228
See application file for complete search history.

(56) References Cited

U.S. PATENT DOCUMENTS

| | | | |
|---|---|---|---|
| 6,940,826 | B1 | 9/2005 | Simard |
| 7,177,808 | B2 | 2/2007 | Yantorno |
| 7,181,019 | B2 | 2/2007 | Breebaart |
| 7,245,710 | B1 | 7/2007 | Hughes |
| 7,542,896 | B2 | 6/2009 | Schuijers |
| 7,724,885 | B2 | 5/2010 | Jarske |
| 7,805,313 | B2 | 9/2010 | Faller |
| 8,280,083 | B2 | 10/2012 | Pallone |
| 2003/0081115 | A1 | 5/2003 | Curry |
| 2007/0168189 | A1* | 7/2007 | Tamura ................. G10L 13/033 704/235 |
| 2009/0110209 | A1* | 4/2009 | Li ........................... H04R 3/04 381/73.1 |
| 2011/0238425 | A1 | 9/2011 | Neuendorf |
| 2012/0250882 | A1 | 10/2012 | Mohammad |
| 2013/0006622 | A1* | 1/2013 | Khalil .................. G10L 19/012 704/233 |
| 2015/0248889 | A1 | 9/2015 | Dickins |

OTHER PUBLICATIONS

Hirvonen, T. et al "Sinusoidal Spatial Audio Coding for Low-Bitrate Binaural Reproduction" IEEE International Conference on Acoustics, Speech and Signal Processing, Mar. 14-19, 2010, pp. 389-392.
Hirvonen, T. et al "Top-Down Strategies in Parameter Selection of Sinusoidal Modeling of Audio" IEEE International Conference on Acoustics Speech and Signal Processing, Mar. 14-19, 2010, pp. 273-276.
Cohen, I. et al "Spectral Enhancement by Tracking Speech Presence Probability in Subbands" Proc. IEEE Workshop on Hands Free Speech Communication, HSC '01, Kyoto, Japan, Apr. 9-11, 2001, pp. 95-98.
Cohen, I. et al "Noise Estimation by Minima Controlled Recursive Averaging for Robust Speech Enhancement" IEEE Signal Processing Letters vol. 9, Issue 1, pp. 12-15, published in Jan. 2002.
Cohen, I. et al "Speech Enhancement for Non-Stationary Noise Environments" vol. 81, Issue 11, Nov. 2001, pp. 2403-2418.
Martin, Rainer "Spectral Subtraction Based on Minimum Statistics" Proc. Euro. Signal Processing Conf. EUSIPCO, 1994, pp. 1182-1185.
Voss, R. et al "1/f Noise" in Music: Music from 1/f Noise, Journal of the Acoustical Society of America, vol. 63, pp. 258-263, Jan. 1978.
Procaccia, I. et al Functional Renormalisation Group Theory of Universal 1/f Noise in Dynamical Systems, Phys Rev 28 A, 1210-pp. 1212 (1983).
Schuster, H.G. et al Deterministic Chaos—An Introduction (4th Edition), Wiley-VCH Verlag, Weinheim, Germany, 2005.

* cited by examiner

SPATIAL COMFORT NOISE

CROSS-REFERENCE TO RELATED APPLICATIONS

This application claims priority to Chinese Patent Application No. 201310081933.3, filed on 14 Mar. 2013 and U.S. Provisional Patent Application No. 61/807,417, filed on 2 Apr. 2013, each of which is hereby incorporated by reference in its entirety.

COPYRIGHT & TRADEMARK NOTICES

One or more portions of the disclosure of this patent document may contain material that is subject to copyright protection. The copyright owner has no objection to the facsimile reproduction by any one of the patent documents or the patent disclosures, as they appear in the files or records of any patent office in which the disclosure is filed, e.g., the U.S. Patent and Trademark Office, but otherwise reserves all copyrights whatsoever.

Certain marks referenced herein may be trademarks or registered trademarks of third parties. Use of these marks is solely for providing an enabling disclosure by way of example and is not to be construed as limiting the scope of this invention to material associated with such trademarks.

INTRODUCTION AND BACKGROUND

Comfort noise is known in the field of telecommunications, and is used to add noise when there is cessation or reduction in data transmission during times when there is no active speech present, e.g., when discontinuous transmission (DTX) is used. Without comfort noise, such a "dead" segment of complete silence typically creates the sense of loss or absence of a far end presence, which can be disconcerting to a listener. Adding comfort noise as a synthetic or statistical noise to fill in the absence of a significant signal in an audio stream due to DTX or other audio processing creates a more perceptually continuous audio stream.

A voice conferencing system, including the voice portion of a video conferencing system, e.g., of a telepresence system, allows a possibly large number of participants to communicate by voice simultaneously. Handling DTX by adding comfort noise in such a system can be complicated. A typical system might limit the buildup of noise or comfort noise from the incoming streams by switching or selecting a subset of the active audio streams, and only mixing the selected portions together. This may work for a simple mono conference bridge, but is not ideal in many cases.

Some conferencing systems make use the spatial properties of the audio, which additionally complicates using comfort noise, e.g., causing difficulty maintaining continuity between the intended and synthetic audio segments.

This invention presents a system design to create a sense of presence at a spatial audio conferencing endpoint (also called a spatial audio conferencing client) by adding spatial comfort noise comprising a plurality of spatial noise signals that have spectral properties, e.g., amplitude-metric spectra such as power spectra, which are typical of comfort noise, and at least one spatial property that substantially matches at least one target spatial property.

A typical conferencing system includes a conference server to which endpoints are coupled. Several conferencing architectures are known, e.g., centralized control, endpoint-mixing, full-mesh architecture, and multicast architecture. For each of these, what is called herein a conference server is the single entity, or is the functional combination of a set of distributed entities, that carries out control. One example is a multipoint control unit (MCU), a device commonly used to bridge the conferencing by mixing the audio (or audio-visual) streams.

One possible approach to conferencing includes a restricted set of the active audio streams being retained and forwarded from a conference server. Such an approach avoids the buildup or potential for excessive comfort noise by attrition occurring at the server. This might be problematic in a conferencing system in which the default action of the server is the combination of or the combined processing of several streams. In such a system, no audio is dropped, and therefore, there is an issue of how to manage the intended comfort noise from all incoming streams.

The present invention provides a way to achieve the desired perceptual continuity offered by comfort noise by carrying out processing at a receiving, i.e., listening endpoint, whilst avoiding the complications of managing comfort noise from the set of individual streams that may be heard by the receiving client.

DESCRIPTION OF EXAMPLE EMBODIMENTS

Figure 1:
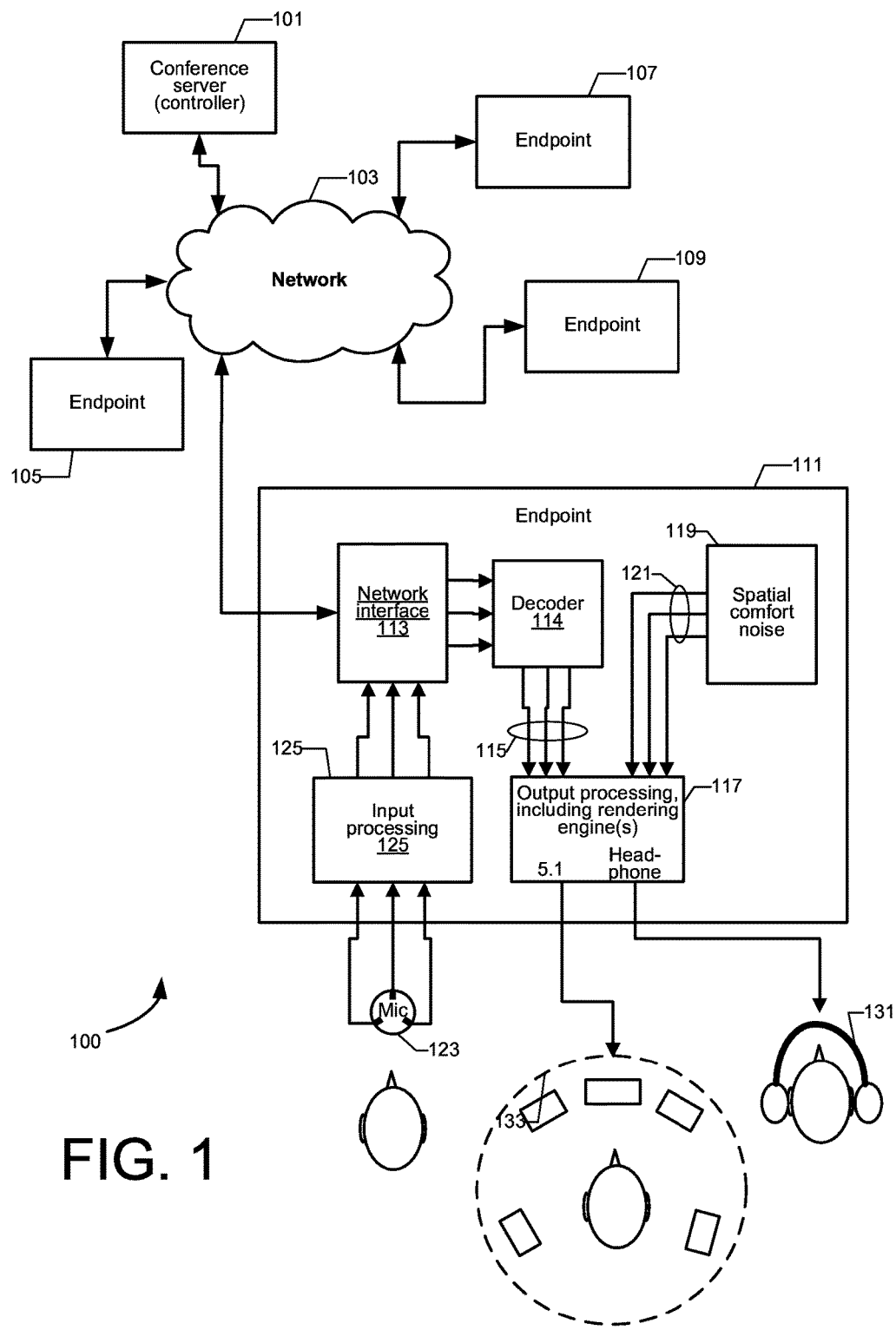
FIG. 1 shows a simplified schematic diagram of an example conferencing system 100 that includes an embodiment of the present invention.

Reference will now be made in detail to several embodiments, examples of which are illustrated in the accompanying drawings. It is noted that wherever practicable similar or like reference numbers may be used in the drawings and may indicate similar or like functionality. The drawings depict some of the possible embodiments of the disclosed system (or method) for purposes of illustration only; many embodiments of the present invention are technologically possible. It will be apparent to those of ordinary skill in the art from the present disclosure how to implement them.

Overview

Embodiments of the present invention include a method, an apparatus, logic comprising executable instructions encoded in a non-transitory computer-readable medium to carry out a method), and a non-transitory computer-readable medium configured with, e.g., storing such instructions. The method is to generate and spatially render spatial comfort noise at a receiving endpoint of a conference system, such that the comfort noise has spectral and spatial properties typical of comfort noise.

Particular embodiments include a method, in a receiving endpoint of a conference system, of providing spatial comfort noise. The method comprises: generating one or more noise signals; processing the one or more generated noise signals to form a plurality of spatial comfort noise signals having target spectral characteristics typical of comfort noise, and at least one spatial property that at least substantially matches at least one target spatial property; and rendering the spatial comfort noise signals to a set of output signals for loudspeakers (the term "loudspeakers" including headphones) to be heard by one or more conferees at the receiving endpoint.

One embodiment further comprises receiving one or more audio signals for rendering at the receiving endpoint, and combining received audio signals with the a plurality of spatial comfort noise signals.

In one embodiment, the rendering renders the combination of the received audio signals and the spatial comfort noise signals to the set of output signals for loudspeakers, such that the spatial comfort noise signals are continually in the output signal in addition to the output from the received audio signals.

In one embodiment, the processing comprises: filtering the one or more generated noise signals such that the filtered one or more signals have the target spectral characteristics typical of comfort noise; and spatially modifying the filtered one or more signals such that the modified and filtered one or more noise signals have the desired spatial property and form the plurality of spatial comfort noise signals. In one version, the filtering of each generated noise signal is by a respective bandpass filter with a frequency response that has a substantially first-order nature and a pass band in the range of 40 to 200 Hz. In one version, the pass band is in the range of 50 to 150 Hz.

In one embodiment, the plurality of spatial comfort noise signals is combined with one or more audio signals received from one or more sending endpoints that include noise suppression, such that the spatial comfort noise signals are continually in the output signal, and the one or more audio signals are received in coded form and decoded using a decoder that includes a decoder random noise generator, the decoder forming decoded data. In such an embodiment, the generating of the one or more noise signals uses the decoder random noise generator, and the generated comfort noise is continually combined with the decoded data and the combination is rendered.

In one embodiment, the plurality of spatial comfort noise signals is combined with one or more audio signals received from one or more sending endpoints that include noise suppression, such that the spatial comfort noise signals are continually in the output signal. In such an embodiment, one or more sending endpoints are operative to carry out noise suppression, and the noise suppression uses knowledge that the receiving endpoint generates and continually includes spatial comfort noise signals in said receiving endpoint's output.

In one embodiment, the processing comprises spatially modifying according to a linear mapping defined by a warping matrix. In one version of such an embodiment, a warping matrix maps to a known spatial sound format.

In one embodiment, the rendering includes determining a binaural representation having the target spectral characteristics and the at least one spatial property.

In one embodiment, the loudspeakers are in a headset.

Particular embodiments include an endpoint apparatus in a conference system, comprising: one or more processors and a storage subsystem configured with instructions that, when executed by the one or more processors, cause the endpoint apparatus to carry out a method comprising the steps in any one of the above-described embodiments.

Particular embodiments include a non-transitory computer-readable medium configured with instructions that when executed by one or more processors of a processing system included in a receiving endpoint of a conference system, carry out a method as recited in any of the above-described embodiments.

Particular embodiments include a non-transitory computer-readable medium configured with instructions that when executed by one or more processors of a processing system included in a receiving endpoint of a conference system, carry out a method of providing spatial comfort noise. The method comprises: generating one or more noise signals; processing the one or more generated noise signals to form a plurality of spatial comfort noise signals having target spectral characteristics typical of comfort noise, and at least one spatial property that at least substantially matches at least one target spatial property; generating a combination of the plurality of spatial comfort noise signals and a plurality of audio signals received at the receiving endpoint from a sending endpoint; and rendering the combination of the received audio signals and the spatial comfort noise signals to a set of output signals for loudspeakers.

Particular embodiments include an endpoint apparatus in a conference system, comprising: means for receiving one or more or more audio signals from other endpoints for rendering at the receiving endpoint; means for generating spatial comfort noise signals having target spectral characteristics typical of comfort noise, and at least one spatial property that at least substantially matches at least one target spatial property; means for combining received audio signals with the spatial comfort noise signals; and means for rendering the combination of the received audio signals and the spatial comfort noise signals to the set of output signals for loudspeakers, such that the spatial comfort noise signals are continually in the output signal in addition to the output from the received audio signals.

In one embodiment, the means for generating the spatial comfort noise signals includes: means for generating one or more noise signals and means for processing the one or more generated noise signals to form the plurality of spatial comfort noise signals. The means for processing including means for filtering the one or more generated noise signals such that the filtered one or more signals have the target spectral characteristics typical of comfort noise; and means for spatially modifying the filtered one or more signals such that the modified and filtered one or more noise signals have the desired spatial property and form the plurality of spatial comfort noise signals.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Some Example Embodiments

FIG. 1 shows a simplified schematic diagram of an example conferencing system 100 that includes an embodiment of the present invention. The system 100 comprises a conference server 101 that acts as the controller for a conference that includes one or more participating endpoints, and is coupled to a network 103 (e.g., a packet network such as an Internet Protocol (IP) network, a public internetwork such as the Internet, a switched telephone network, or a private network, and so forth), and endpoints 105, 107, 109, and 111, each coupled to the network 103. More or fewer elements can be included in different systems. Not all endpoints need to be identical. Some, for example, may be telephones, while others may be smart mobile telephone devices, and yet others may be systems built into a purpose-built conference room. Each endpoint may further include capture and display video information, i.e., communicate audiovisual information. The present invention relates to the audio part of such audiovisual information.

Conference data to and from the endpoint 111, including encoded audio data, is transmitted and received in an agreed upon form, e.g., in the IP example, using voice over IP (VoIP) with RTP or some other protocol, using, e.g., SIP for session control. The invention is not limited to any particular communication mechanism or form. For example, the functionality of the conference server may be distributed amongst some or all endpoints. Furthermore, the invention is not limited to the architecture that uses conference server 101 that acts as the controller for a conference.

The audio portions of example endpoint 111 are shown in more detail, and include an embodiment of the present invention that is configured to generate and add spatial comfort noise comprising a plurality of spatial noise signals, which have spectral properties, e.g., amplitude-metric spectra such as power spectra that are typical of comfort noise, and at least one spatial property that substantially matches at least one target spatial property.

From now on, only the audio processing side will be described. One skilled in the art would understand that the conferencing system and the endpoint 111 may include one or more of video data, textual data, and other forms of data.

In the example embodiment, endpoint 111 includes a network interface 113 configured to send and receive data to and from the network 103, including audio data that typically is coded (compressed).

The Send-Side Output Processing of an Example Endpoint

Figure 2:
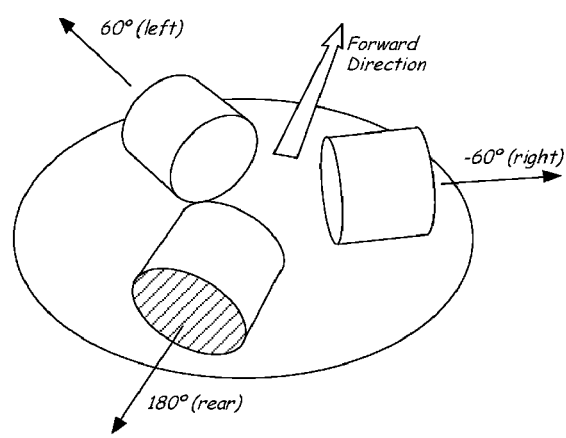
FIG. 2 shows a cluster of three cardioid microphones at azimuth angles of 60°, −60°, and 180°, respectively, measured counterclockwise from an X-axis pointing towards the front, e.g., to the source of voice.

While key aspects of the invention relate to the receive-side processing of endpoints, such receive-side processing may also affect or be affected by the send-side input processing of an endpoint. One embodiment of the endpoint 111 includes a set of one or more microphones 123 to provide audio input signals in some format, e.g., in the case of including spatial information, in one of a binaural format, a soundfield format, a surround-sound format, and as set signals from a plurality of microphones. In the example of FIG. 1, the set 123 includes a cluster of three cardioid microphones at azimuth angles of 60°, −60°, and 180°, respectively, measured counterclockwise from an X-axis pointing towards the front, e.g., to the source of voice, as shown in FIG. 2. The soundfield, in two dimensions, from such a cluster, may be transported as three signals, commonly denoted L, R, and S for the cardioid microphone signals at of 60°, −60° and 180°, respectively. More or fewer microphones may be used, e.g., four or more to capture a three-dimensional soundfield, or some other signals from the set 123. The microphone signals may also be generated in some other coordinate system, e.g., as the set of signals from an array of microphones, as the set of signals denoted $E_1, E_2, \ldots E_M$ for an M-microphone array, or in so-called B-Format in which, for the first-order 2-D case (horizontal B-format), includes three signals, individually named W, X, and Y, that correspond to an omnidirectional microphone signal (W) along with two dipole microphone signals (X and Y) that have their maximum positive gains aligned with the X and Y axes respectively.

The one or more signals from the microphone set 123 are accepted by an input processing module 125 coupled to the network interface 113 to generate encoded audio to be transmitted to the network 103, using an agreed upon format and protocol, and suitably encoded.

The input processing of module 125 is configured to accept (as input audio) the captured audio signals that are output from microphone set 123, and to carry out processing, e.g., carried out by subsystems well-known in the art. In one embodiment, the processing includes sampling the input audio, forming frames (also called blocks) of samples, e.g., with an overlap, performing a time-domain to transform-domain, e.g., to frequency-domain transform on the frames of samples, and generating pre-processed audio in response to the frequency-domain samples. The processing of module 125 furthermore may include one or more of noise estimation, noise suppression, and suppression of out-of-location signals. In some embodiments, there is also a reference audio signal captured at the endpoint, and the processing of module 125 further includes echo suppression. In some implementations, the pre-processed audio is a mixed-down, single-channel, frequency-domain audio signal, together with some spatial information. In other embodiments, the pre-processed audio is a multi-channel signal, e.g., in WXY.

The input processing module 125 may include a spatial modifier, and a soundfield convertor. Conversions between various soundfield, binaural, and surround-sound formats are well known to those skilled in the art, such a conversion typically involving a linear transformation defined by a matrix.

In some implementations, input processing module 125 also performs beamforming, e.g., beamforming in the time domain to generate a mixed-down signal prior to transformation into the frequency domain.

For simplicity, we shall refer to each block or frame of samples of all the channels as a "frame" of samples. In the case of the output being in the frequency domain, in some embodiments, the frames are banded into a number of frequency bands, e.g., into between 15 and 60, e.g., 32 bands spaced on a perceptual scale, e.g., critical bands.

The suppression is achieved, in one embodiment, by determining a set of gains for each frequency band of data, and applying the gain to each frequency band data.

Input processing module 125 also may include a voice activity detector (VAD) configured to generate a control value indicative of whether each frame of the audio is indicative of speech (e.g., speech in the presence of noise) or only of noise.

Different embodiments of an endpoint may include some, but not all, of the elements and functions described herein.

PCT Application Publication No. WO 2012/109384, having international filing date Feb. 8, 2012, published on Aug. 16, 2012, and assigned to the assignee of the present invention, describes a method and system for suppression of noise in audio captured, e.g., using a single microphone or an array of microphones, at a conferencing system endpoint. The noise suppression is applied to a voice signal captured at a single endpoint, and is a function of both spatial properties and frequency, e.g., the frequency band. The spatial-properties dependence, for example, is to suppress noise more if it would be perceived when rendered as emitting from a source at a different location than the source of voice being uttered and captured at the endpoint. The frequency-dependence, e.g., frequency-band-dependence is a result of determining a frequency dependent suppression depth, which is an amount of gain reduction per frequency band, and leads to reducing the gain of the noise in each frequency band in accordance with the frequency dependent suppression depth.

One embodiment of input processing module 125 includes the method and subsystems essentially as described in PCT Publication WO 2012/109384. Other embodiments use different architectures known to those skilled in the art.

Figure 3:
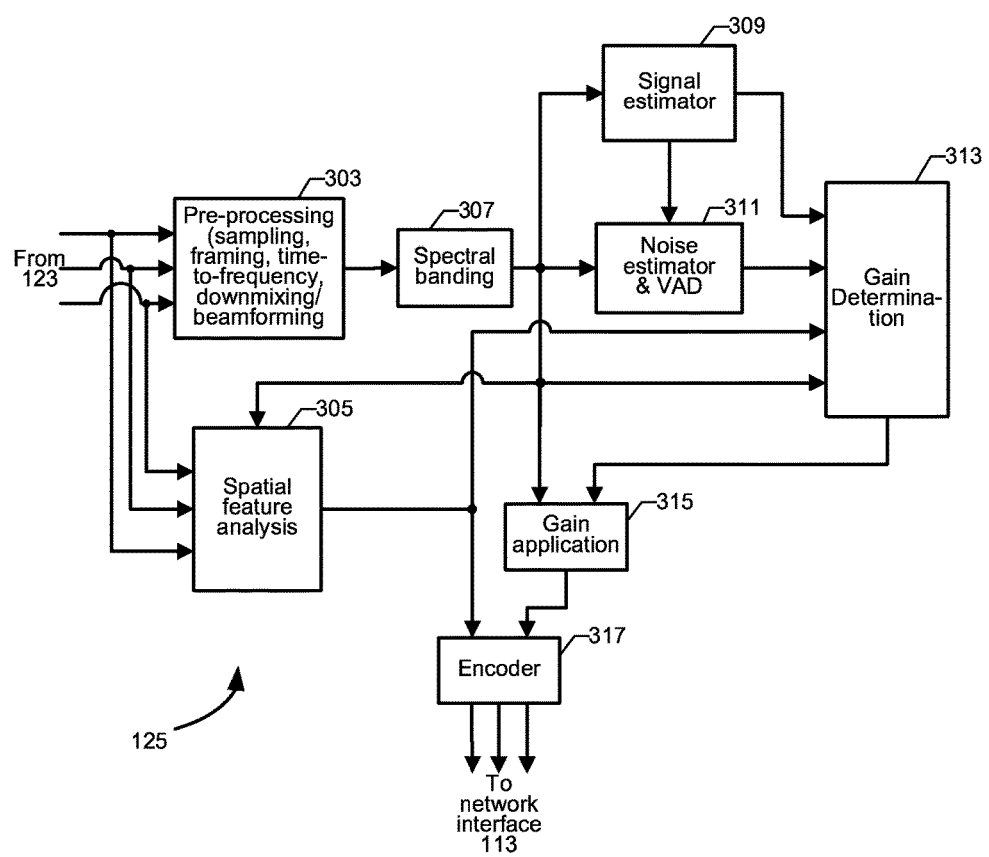
FIG. 3 shows in more detail a block diagram of one example embodiment of an input processing portion of an endpoint that includes an embodiment of the present invention.

FIG. 3 shows in more detail a block diagram of one example embodiment of an input processing portion 125 of endpoint 111 that accepts a plurality of inputs from microphones 123 and that is thus configured to capture sound during a teleconference, and elements 303, 305, 307, 309, 311, 313, 315, 317, coupled as shown in FIG. 3 and configured and operative to generate, in response to the outputs of the microphones, an encoded audio signal for transmission to the server 101 or to each of endpoints 105, 107, 109 and any other endpoints of the system shown in FIG. 1.

Pre-processor 303 is configured: to accept as input audio the captured audio signals from microphones 123; to sample the input audio; to perform a time-domain to frequency-domain transform on the resulting samples; and to generate pre-processed audio in response to the frequency-domain samples. In some implementations, the pre-processed audio is a mixed-down, single-channel, frequency-domain audio signal, e.g., produced in a beamforming stage or subsystem of pre-processor 303. In other embodiments, the pre-processed audio is a multi-channel signal, e.g., a three-channel audio signal, e.g., in WXY format. Each of the pre-processed, frequency-domain outputs of pre-processor 303 is for a sequence of frames of audio samples. For simplicity, the output from pre-processor 303, whether a single or multiple channels, is called a "frame" of samples.

Spectral banding element 307 is configured to generate a set of banded values for each frame, e.g., B bands, centered at frequencies whose separation is monotonically non-decreasing. In some particular embodiments, the band separation is monotonically increasing in a log-like manner, e.g., on a psycho-acoustic scale. In one embodiment, the frequency bands are critically spaced, or follow a spacing related by a scale factor to critical spacing. The banding elements include a set of linear filters whose bandwidths and spacings are constant on the Equivalent Rectangular Bandwidth (ERB) frequency scale. Some skilled in the art believe the ERB frequency scale more closely matches human perception. The Bark frequency scale also may be used. All such log-like banding is called "perceptual banding" herein. Typically, each band should have an effective bandwidth of around 0.5 to 2 ERB with one specific embodiment using a bandwidth of 0.7 ERB. In some embodiments, each band has an effective bandwidth of 0.25 to 1 Bark. One specific embodiment uses a bandwidth of 0.5 Bark. In one embodiment, the banding element 307 generated for each frame between 15 and 60, e.g., 30 bands on a perceptual scale such as the ERB frequency scale, i.e., the banding, is into critical bands.

In one embodiment, the B bands are centered at frequencies whose separation is monotonically non-decreasing. In some particular embodiments, the band separation is monotonically increasing in a log-like manner. Such a log-like manner is perceptually motivated. In some particular embodiments, they are on a psycho-acoustic scale, that is, the frequency bands are critically spaced, or follow a spacing related by a scale factor to critical spacing.

Banded spatial feature estimator 305 is configured to generate spatial features, e.g., spatial probability indicators from the banded samples from pre-processor 303, (or in some versions, from the microphone signal samples). These indicators can indicate an apparent source direction or location, or a range of locations or directions of sound in some or all of the frequency bands of a frame, and can be used for suppression to spatially separate a signal into components originating from a desired location and components not so originating. This, together with beamforming in pre-processor 303, may provide some suppression of out-of-position signal power and some suppression of noise.

In some embodiments, the spatial feature estimator 305 determines estimates of the mean values and the covariance matrix of the banded signals.

Signal estimator 309 is configured to determine a banded power spectrum (or other amplitude-metric spectrum) of the signal from each frame of samples.

A noise estimator and voice activity detector (VAD) 311 is configured to determine an estimate of the banded power spectrum (or other amplitude-metric spectrum) of the noise, and further is configured to generate a control value denoted S indicative of whether each frame of the samples is indicative of speech (with noise) or only of noise. In one embodiment, S is between 0 and 1 and equal to, or a monotonic function of the probability of voice being present.

One embodiment of element 311 determines the banded noise amplitude-metric denoted $N_b'$, e.g., the power spectrum using a minimum statistic and minimum follower, as described in R. Martin, "Spectral Subtraction Based on Minimum Statistics," in Proc. Euro. Signal Processing Conf. (EUSIPCO), 1994, pp. 1182-1185. An alternate embodiment, rather than following the minimum value over a window, as for example in the above Martin reference, determines banded noise power using a "leaky" minimum follower, e.g., that has exponential tracking with a tracking rate defined by at least one minimum follower leak rate parameter, which is the rate over time at which the minimum follower will track, e.g., expressed in dB/sec, e.g., about 20 dB/sec (or more broadly, in the range of 1 to 30 dB/sec). In one embodiment, the rate parameter of the minimum follower is controlled by S, the probability of voice being present as determined by the VAD portion of element 311. If the probability of voice indicates that there is a high probability of voice being present, the leakage is a slower, and if there is high probability that there is not voice, the leakage is faster. In one embodiment, a rate of 10 dB/sec is used when voice is indicated, whilst a value of 20 dB/sec is used otherwise. In an alternate embodiment of element 311, determining the noise level $N_b'$, uses minima controlled recursive averaging. See, e.g.: I. Cohen and B. Berdugo, "Spectral enhancement by tracking speech presence probability in subbands," in Proc. IEEE Workshop on Hands Free Speech Communication, HSC'01, Kyoto, Japan, Apr. 9-11, 2001, pp. 95-98; I. Cohen and B. Berdugo, "Speech enhancement for nonstationary noise environments," Signal Processing, Vol. 81, No. 11, pp. 2403-2518, November 2001; and I. Cohen and B. Berdugo, "Noise Estimation by Minima Controlled Recursive averaging for Robust Speech Enhancement," IEEE Signal Processing Letters, Vol. 9, No. 1, January 2002, pp. 12-15.

Gain determination stage 313 uses the control values, the spatial indicators, and one or more of the estimated signal power spectrum and the instantaneous banded signal power for each frame of samples to determine a set of gain control values for configuring a gain application stage 315. The gain application stage is configured to apply an appropriate gain to each frequency band of the samples to achieve one or more of noise suppression and suppression of out-of-location signals.

In some embodiments, an implementation of stage 313 (or a similar gain determination stage) determines gain control values that additionally are for configuring gain stage 315 to modify each frame of noise-only samples captured at the endpoint in accordance with a common target that includes a target power spectrum (or other amplitude-metric spectrum) and a target spatial property set. In one version of the conference system, such modification of noise samples is included in each endpoint of the system shown in FIG. 1, and furthermore all the endpoints may use the same target so that the modified noise at the different endpoints is more consistent in spectral and spatial properties than is the unmodified noise. Thus, in some embodiments, noise captured at each endpoint is modified to generate modified noise having a power spectrum (or other amplitude-metric spectrum) that matches (at least substantially) a target spectrum and at least one spatial property which matches (at least substantially) a target spatial property. Typically, the speech captured at the endpoints is not so modified. For example, in response to each frame of samples which VAD 311 indicates is likely to be speech, stage 313 determines a set of speech-default gain control values for configuring gain stage 315 to modify the frame. For each frame that is indicated of noise but not of speech, the gain control values for configuring gain stage 315 modify the samples of the frame to generate modified noise samples having a spectrum which matches (at least substantially) a target spectrum and at least one spatial property which matches (at least substantially) a target spatial property. See FIG. 10 and the description thereof herein below.

The samples output from stage 315 are encoded in encoder 317, and the resulting encoded audio signal is typically then transmitted to network interface 113 of FIG. 1, to the server 101, or directly to each of endpoints 105, 107, 109 and to any other endpoints of the system.

Figure 4:
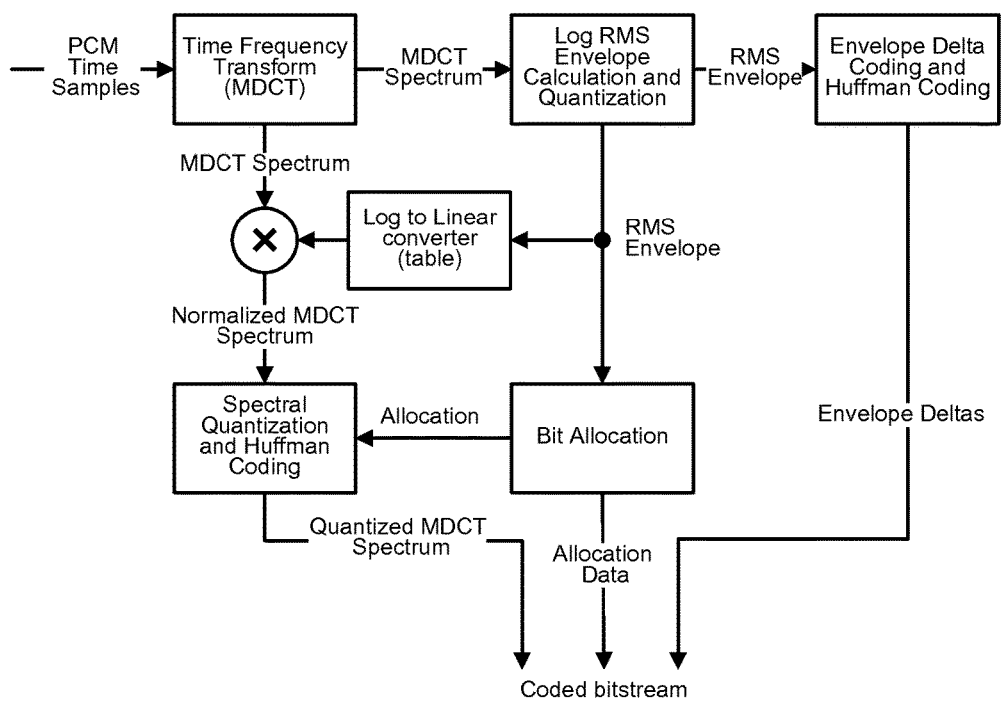
FIG. 4 is a simplified block diagram of an encoder used in an embodiment of the invention in which spatial information usable at the receive end is encoded into the transmitted data.

In one embodiment, the time-to-frequency transform implements a modified discrete cosine transform (MDCT). FIG. 4 shows a simplified block diagram of encoder 317. The encoder is configured to determine amplitude-metric envelope values from MDCT spectral data of frames of input samples, e.g., log RMS envelope, and to quantize the envelope. Encoder 317 is further operative to code the quantized envelope values, e.g., using envelope delta coding and Huffman coding to produce envelope deltas that form part of the coded bitstream output by the encoder. The encoder 317 is further configured to allocate bits to each frequency band of the input quantized envelope to generate allocation data. The encoder is further configured to use the quantized envelope to normalize the MDCT spectral data. The encoder is further configured to form a quantized MDCT spectral data portion of the coded bitstream by quantizing and coding, the normalized MDCT spectral data. In one embodiment, the coded quantized MDCT spectral data, allocation data, and coded envelope deltas of the audio inputs form one or more layers in a layered coded format. In such an embodiment, the encoder provides other information, e.g., one or more of gains, spatial information, and VAD values in one or more layers, and multiplexes the layers for transmission via the network.

The input processing module 125 of endpoint 111 may perform other processing on input audio signals captured by microphones 123 to generate the encoded audio output which is asserted to network 123 via the network interface 113.

Not shown are elements such as analog-to-digital converters that include a quantizer to digitize the audio input signals; digital-to-analog converters to generate a set of audio outputs; and other elements, as would be clear to those skilled in the art.

Any of endpoints 105, 107, and 105 can, but need not, include all the elements of the input processing stage 125 described above, and may include other elements. For example, some embodiments of the input processing include echo suppression.

The Receive-Side Output Processing of an Example Endpoint

Figure 5:
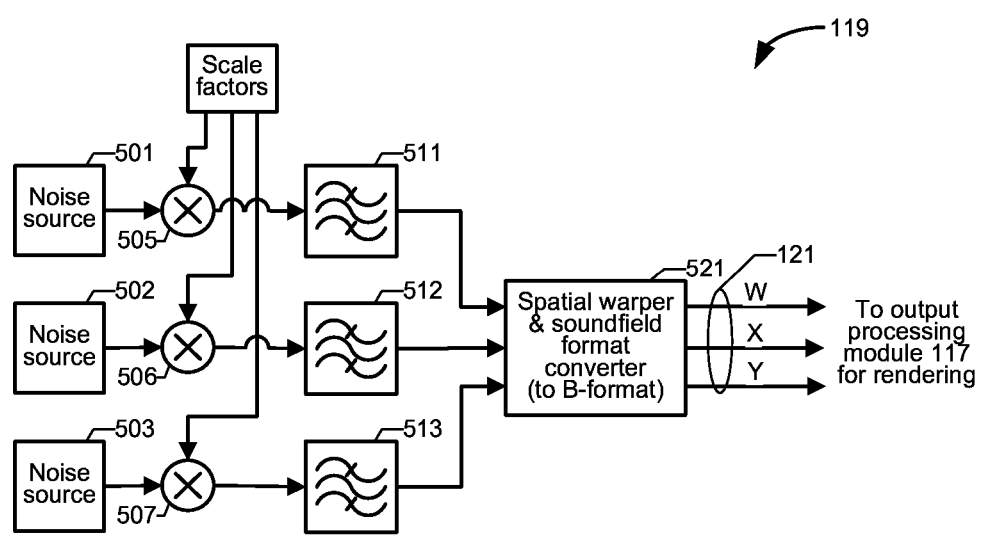
FIG. 5 shows a simplified block diagram of an embodiment of a spatial comfort noise generator that generates a plurality of spatial comfort noise signals having spectral and spatial properties that at least substantially match at least one target spectra property and at least one target spatial property that are typical of comfort noise.

In the example embodiment, the receive side of the endpoint 111 includes the network interface 113 configured to receive data from the network-included encoded audio data in the agreed upon format and protocol, and a decoder 114 configured to produce a plurality of received audio signals 115 to be processed by an output processing module 117. Key aspects of the invention relate to the receive-side processing: endpoint 111 includes a spatial-comfort-noise generator 119 configured to produce a plurality of spatial comfort noise signals 121 that have spectral properties typical of comfort noise, and at least one spatial property that substantially matches at least one target spatial property. In one embodiment, the at least one target spatial property is indicated by a target statistical property; in one version, a covariance matrix. The spatial-comfort-noise generator 119 is coupled to the output processing module 117. The output processing module 117 is configured to combine the received audio signals 115 with the a plurality of spatial comfort noise signals 121, and includes one or more rendering engines configured to render the accepted audio frames combined with the comfort noise frames to form a set of output signals for loudspeakers, e.g., for headphones 131, or for speakers arranged in surround sound arrangement, e.g., a 5.1 arrangement 133, in order to be heard by one or more conferees at the receiving endpoint. In the example embodiment shown, output processing module 117 is configured to produce two sets of output signals, one for headphones 131 and another for a 5.1 arrangement 133. Thus, in one embodiment, the rendering is of the combination of the received audio signals and the spatial comfort noise signals, such that the spatial comfort noise signals are continually output in addition to the output from the received audio signals FIG. 5 shows one embodiment of the spatial comfort noise generator 119 that generates a plurality of spatial comfort noise signals 121 in a desired soundfield or other spatial form, in this example WXY B-format, and that has spectral properties typical of comfort noise and at least one spatial property that substantially matches at least one target spatial property noise. Generator 119 comprises a plurality of noise sources, in the example, three noise sources 401, 402, 403, configured to generate independent and identically distributed (IID) noise samples, e.g., using a random number generator. In one embodiment, each noise signal is Gaussian, consisting of samples normalized to have 0 mean and a variance of 1, while in another embodiment, each noise signal is uniformly distributed, consisting of samples normalized to be in the range the range −1 to 1. Scale elements 405, 406, and 406 are configured to scale the respective noise samples to be at some level below the nominal speech level. In one embodiment, the noise samples are scaled to be at a level between 30 and 60 dB below nominal RMS speech level.

The noise is adjusted to modified noise signals 121 that have a target amplitude-metric spectrum, e.g., a target power spectrum, and a target spatial property set. The target spectral characteristics are selected to be spectral characteristics typical of comfort noise. Thus, in one embodiment, the filter for each noise signal is to generate noise with a power spectrum typical of comfort noise. The spectral modification uses, in one embodiment, a set of bandpass filters 511, 512, and 513. In one embodiment, these are first order bandpass filters with a pass band from 50 Hz to 150 Hz, and in another, from 50 Hz to 200 Hz. In one embodiment, the first order filters are each a first-order time domain Butterworth bandpass filter with the pass band from 50 Hz to 150 Hz. This was found to produce pleasing results to human subjects after spatial property modification and combining with voice signals, which may be silent, and after rendering. Note that the invention is not limited to any particular passband filter design, to any passband, or even to any particular method of causing the noise to have the desired target spectral characteristics and target spatial characteristics.

Figure 6:
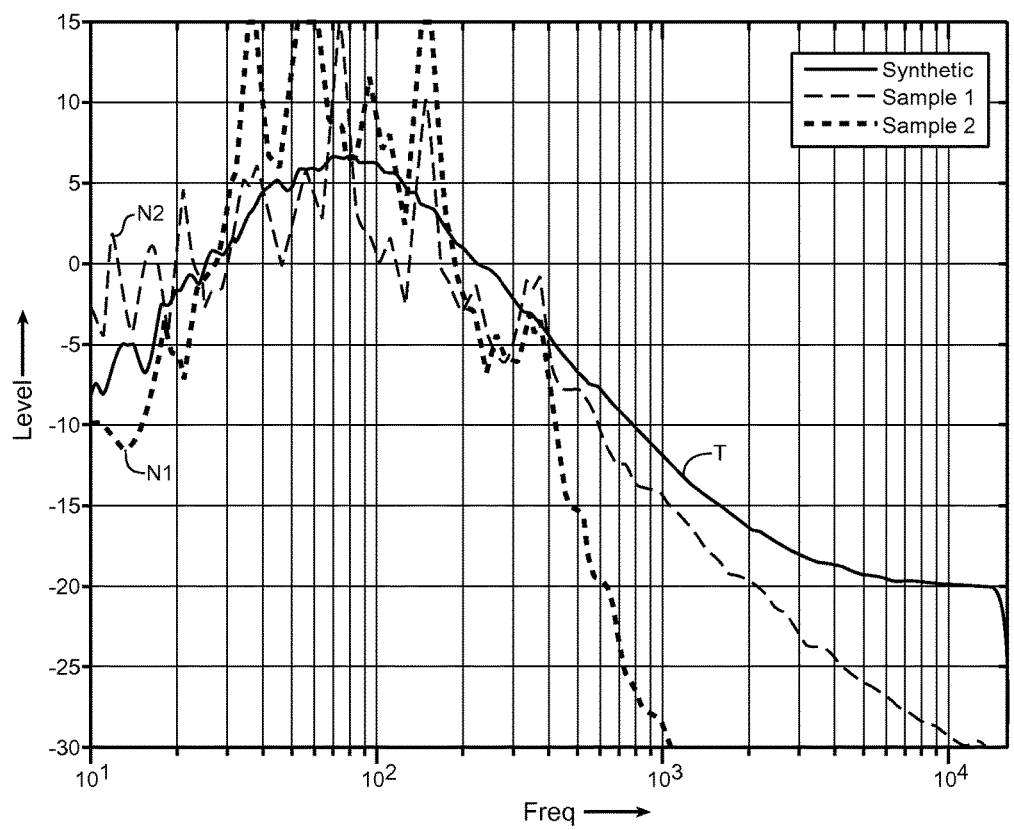
FIG. 6 shows example spectra compared with the synthetic spatial comfort noise spectra as generated for the spatial sources according to embodiments of the present invention.

FIG. 6 shows, as curve T, a target spectrum for use in typical embodiments of the invention for the noise after the filtering of 511, 512, and 513 by the first-order time domain Butterworth bandpass filter with the pass band from 50 Hz to 150 Hz. The Inventors found that this generates noise that has spectral characteristics typical of comfort noise. Since the band pass at 50 Hz and 150 Hz is only first order, it will drop away 6 dB from 150 Hz to 300 Hz. Similarly, there is a 6 dB fall from 50 Hz to 25 Hz. Such generated noise has a "pink noise" spectral characteristic typical of background noise present in many offices and conference rooms at lower frequencies. When used in embodiments of the invention, the spectrum may be scaled by the desired absolute noise output level, e.g., typically about 20-60 dB below the desired absolute speech output level. For comparison, FIG. 6 also shows power spectra of two actual noise signals, labeled N1 and N2, captured in two different rooms containing typical conferencing system endpoints.

The modification to have the target spatial property set comprises rendering the filtered noise signals, in output processing stage 117, or elsewhere, as a set of far field sources. In one embodiment, the rendering is combined with a spatial modification stage 521. In one embodiment, the three signals are generated in a soundfield format, e.g., left, right, surround (LRS) format, or horizontal B-Format defined by W, X and Y (XYZ) signals.

In one embodiment, the spatial modification stage 521 is configured to map the three soundfield, to a horizontal B-Format defined by W, X and Y, signals that have at least one target spatial property. This was found to work well. The invention, however, is not limited to the noise being converted into a soundfield form, or into any other form, such as surround sound form, or simply as a set of signals from a microphone array. The invention is also not limited to using any particular mapping to a particular pre-defined soundfield format. Furthermore, the rendering may be to a soundfield format, or, in case it is known that only headphone output is used, one embodiment creates only two noise signals, filters to spectrally shape the signals, and filters using an HRTF (head related transfer function) spatial filter set, commonly known in the art, to directly generate binauralized outputs for the headphone.

In one embodiment, the spatial modification of stage 521 is a linear mapping defined by a 3×3 matrix, denoted M and called a warping matrix that in one embodiment combines mapping between a first and a second soundfield format with achieving at least one target spatial property indicated by a target statistical property, e.g., a target covariance matrix. An alternate name for stage 521 is spatial warping stage 521.

The following are conversions from LRS to XYZ, and from XYZ to LRS, in each case, preserving the reference level of the signals. To convert a signal vector $[X\ Y\ Z]^T$ to a signal vector $[L\ R\ S]^T$, with $(\bullet)^T$ denoting the matrix transpose, $[X\ Y\ Z]^T = M\ [L\ R\ S]^T$, with $$M = \begin{bmatrix} \frac{2}{3} & \frac{2}{3} & \frac{2}{3} \\ \frac{2}{3} & \frac{2}{3} & -\frac{4}{3} \\ \frac{2}{\sqrt{3}} & -\frac{2}{\sqrt{3}} & 0 \end{bmatrix}.$$

Similarly, to convert from a signal vector $[L\ R\ S]^T$ to signal vector $[X\ Y\ Z]^T$ preserving the reference level, $$M = \begin{bmatrix} \frac{1}{2} & \frac{1}{4} & \frac{\sqrt{3}}{4} \\ \frac{1}{2} & \frac{1}{4} & -\frac{\sqrt{3}}{4} \\ \frac{1}{2} & -\frac{1}{2} & 0 \end{bmatrix}.$$

In one embodiment, the matrix M operation of the spatial modification stage 521 is configured to create target statistics in the WXY domain, e.g., a desired covariance matrix in the WXY domain, denoted $R_T$.

In one embodiment, scale elements 505, 506, and 507 for noise sources 501, 502, and 503, respectively, are adjusted not only to achieve a target level below the nominal speech level, but are further configured such that the needed matrix operation M of spatial modification stage 521 to achieve the desired covariance matrix is a simple identity matrix, so that stage 521 is a pass-through, implemented in one version using settable parameters, e.g., to not carry out the operation 521. In the case of isotropic noise, W, X and Y components of the noise will be uncorrelated, and therefore can be mapped to have the desired levels. Starting with isotropic noise, appropriate scaling of the input streams using scale elements 505, 506, and 507 for noise sources 501, 502, and 503 can achieve stage 521 defined by identity matrix, i.e., a pass-through.

In the more general case, let the input to stage 521 be represented by vector $X_0$ with mean $\bar{X}_0$ (e.g., $X_0=[X_0\ Y_0\ Z_0]^T$ with mean $\bar{X}_0$, which, in one embodiment, is the zero vector 0), and suppose initially the covariance matrix of the noise is $R_0$. Denote the output noise 121 by vector X (e.g., $X_0=[X\ Y\ Z]^T$) with a mean $\bar{X}$ and desired covariance matrix $R_T$. Then stage 521's applying warping matrix M would result in the mean value $$\bar{X}=M\bar{X}_0,$$

and covariance matrix $$R_T = M R_0 M^T$$

To achieve this, $$M=[R_T R_0^{-1}]^{1/2}=[R_T/R_0]^{1/2} \text{ in MATLAB notation},$$

where, for a matrix A, the square root matrix $A^{1/2}$ is the solution B to the matrix equation $BB^T - A = 0$, or if B is symmetric, $BB - A = O$. If a matrix A is a covariance matrix, it is positive-semidefinite and symmetric, so is diagonalizable and has non-negative eigenvalues. There exists a matrix V such that $A = V\Lambda V^T$, where $\Lambda$ is a diagonal matrix of the eigenvalues of A, and $A^{1/2} = V\Lambda^{1/2}V^T$, with $\Lambda^{1/2}$ a diagonal matrix with each element the square root of the corresponding element of $\Lambda$, i.e., with eigenvalues being square root of the corresponding eigenvalues of $\Lambda$.

In one embodiment, noise sources 501, 502, and 503 produce independent identically distributed (i.i.d.) random signals, e.g., three independent unit variance Gaussian signals, such $R_0 = I$ (without the scaling of 505, 506, 507). To achieve desired covariance denoted $R_T$ having desired spatial statistical properties, stage 521 applies a warping matrix $$M = [R_T]^{1/2}.$$

In some embodiments, the target spatial property is such that the noise 121 is rendered so as to be perceived as originating from an apparent source location, e.g., away from a different apparent source location. As an example, suppose again the noise $R_0 = I$ (without the scaling of 505, 506, 507), and it is desired to achieve a light spatial skew in the noise components, e.g., to achieve the following target covariance matrix $R_T$, which corresponds to noise somewhat biased in the zero azimuth direction, $$R_T = \begin{bmatrix} 1 & 1 & 0 \\ 0.1 & 0.9 & 0 \\ 0 & 0 & 0.8 \end{bmatrix}.$$

Then $$M = \begin{bmatrix} 1 & 1 & 0 \\ 0.1 & 0.9 & 0 \\ 0 & 0 & 0.8 \end{bmatrix}^{\frac{1}{2}} == \begin{bmatrix} 0.9987 & 0.0514 & 0 \\ 0.0514 & 0.9473 & 0 \\ 0 & 0 & 0.8944 \end{bmatrix}.$$

The noise samples of the generated comfort noise are arranged as the frequency bands of each of set of frames of audio samples. Thus, the elements of the desired covariance matrix $R_T$ for each band determine a second order statistic indicative of how the modified noise signals, after application of spatial warping matrix M, are spatially biased in each band. In some embodiments, the target spatial covariance structure $R_T$ may vary across frequency bands. For example, the lower frequency bands may be more correlated in the target which can reduce unpleasant room modes, and at higher bands, the target spatial structure may be isotropic. In some embodiments, the spatial warping matrix is deliberately determined so that it applies spatial bias to input noise in an effort to provide an improved conference experience.

Note that in one embodiment, the scale elements 505, 506, 507 implement the desired noise level depth profile, and further apply scale factors that are a function of frequency bands and that are configured to make the amplitude-metric, e.g., power spectra of the output noise, match the target spectrum. That is, in one embodiment, the filtering of filters 511, 512, 513 is incorporated into the scaling elements 505, 506, 507

Thus, in some embodiments of the invention, a warping matrix M for each frequency band is determined, and by applying these warping matrices to the frequency bands of a frame of generated noise, the inventive system and method make the spectral and spatial properties of the resulting comfort noise match both a target spectrum and target spatial properties.

One feature of embodiments of the invention is the consistent presence of the spatial comfort noise, whether or not speech is present, at a comfort noise level such that the comfort noise becomes perceptually irrelevant in the presence of voice.

Also, since the WXY and/or LRS formats are somewhat detector invariant, there is generally no significant change in the frequency dependent covariance of the signals for isotropic or diffuse noise. In contrast, in the case of a binaural output, such an output implies a certain spacing and degree of correlation that varies with frequency. Thus, by remaining in the soundfield domains LRS or WXY that are based on a co-incident microphone set or centered set of basis functions, the transformation between the independent spatial presence components and the WXY soundfield is a broadband transform, and thus trivially implemented in the time domain.

An additional comment on the above embodiment is that the generated signal in the WXY domain is suitable for many renderings to different sorts of output, e.g., to headphones or to a set of speakers. In the case where the resulting output is just for headphones, it can be shown that the left headphone (L) and right headphone (R) will have an associated covariance matrix which could be realized more directly for a spectral match using an appropriate frequency dependent conversion matrix.

Whilst this is a short cut to simulating diffuse field binaural noise and matching the conventional interaural time difference (ITD) and interaural level difference (ILD) characteristics for a diffuse field, it is evident that the above approach makes use of an existing rendering framework, such as a head-related transform function (HRTF) rendering engine, or a speaker-panning engine, which can be more efficient for a system implementation.

Additionally, the frequency dependent covariance manifest in an HRTF requires a frequency dependent or finite impulse response (FIR) filtering. It is generally easier to use an existing set of rendering filters, appropriately fed with the presence of components consisting of the voice signal, with an added spatial comfort noise, to achieve this, rather than the design of any dedicated diffuse field simulation filters, and some embodiments indeed make use of such existing rendering filters Tuning and Modification of the Input Processing Since in some embodiments, the receive side of an endpoint 111 always has audio heard in the presence of the generated spatial comfort noise, the input processing of an endpoint at which audio is captured can take this into account. In particular, the audio input processing need only work hard enough to reduce any residual or unwanted noise components so that they fall below the masking threshold or annoyance threshold in the presence of the generated spatial comfort noise. In many cases, this represents a lower amount of suppression than would otherwise be applied, which is advantageous in allowing for an improvement in the quality of the voice. This is mostly applicable to a conferencing system that would otherwise have silence around voice segments.

Assuming that another endpoint, e.g., sending endpoint 105, has the same architecture for audio as endpoint 111, including input processing of stage 125, some embodiments of such input-processing 125 include ensuring that the gain does not fall below a pre-defined minimum, so that there is a pre-defined maximum suppression depth. Furthermore, in some embodiments, rather than the gain having the same maximum suppression depth (minimum gain) for all bands, it may be desired that the minimum level be different for different frequency bands. In one embodiment, the gain applied to the banded magnitude-metric spectrum, e.g., power spectrum of the captured signals, denoted $Gain_b'$ is determined as $$Gain_b' = Gain_{b,MIN}' + (1 - Gain_{b,MIN}') \cdot Gain_{b,RAW}',$$

where $Gain_{b,MIN}'$ denotes the minimum gain, and $Gain_{b,RAW}'$ denotes the gain to achieve noise suppression, possibly combined with echo and out-of-location suppression. As one example, in some embodiments of input processing 125, the maximum suppression depth or minimum gain may range from −80 dB to −5 dB and be frequency dependent. In one embodiment the suppression depth is around −20 dB at low frequencies below 200 Hz, varying to be around −10 dB at 1 kHz, and relaxing to be only −6 dB at the upper voice frequencies around 4 kHz.

In some embodiments of input processing 125, the gain processing is controlled by a classification of the input signals, e.g., as being voice or not, as determined by a VAD. In one such signal classification controlled embodiment, the minimum values of the gain for each band, $Gain_{b,MIN}'$, are dependent on a classification of the signal, e.g., whether the signal is determined to be voice by a VAD in embodiments that include a VAD. In one such embodiment, if a VAD determines the signal to be voice, $Gain_{b,MIN}'$ is increased, e.g., in a frequency-band dependent way, to be close to 1, or in another embodiment, by the same amount for each band b. In one embodiment, the amount of increase in the minimum is larger in the mid-frequency bands, e.g., bands between 500 Hz and 2 kHz.

In an improved embodiment, the increase in minimum gain values is controlled to increase in a gradual manner over time as voice is detected, and similarly, to decrease in a gradual manner over time as lack of voice is detected after voice has been detected.

Figure 7:
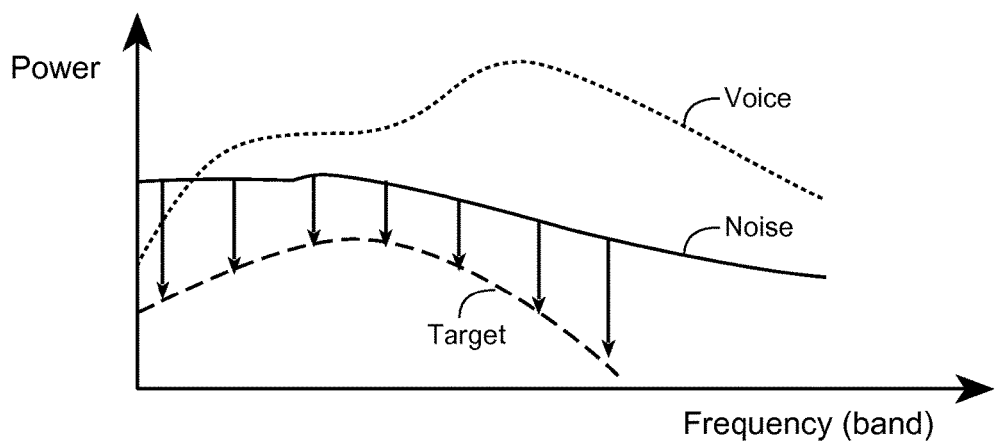
FIG. 7 is a set of two graphs, the first showing a spectrum of typical speech, a spectrum of typical background noise captured during a conference, and a target spectrum desirable for comfort noise. The lower graph indicates gain suppression for modifying the captured noise of the upper graph so that the modified noise has a power spectrum which matches the target spectrum of the upper graph and a curve of suppression gain values for modifying the speech the upper graph.
Figure 7:
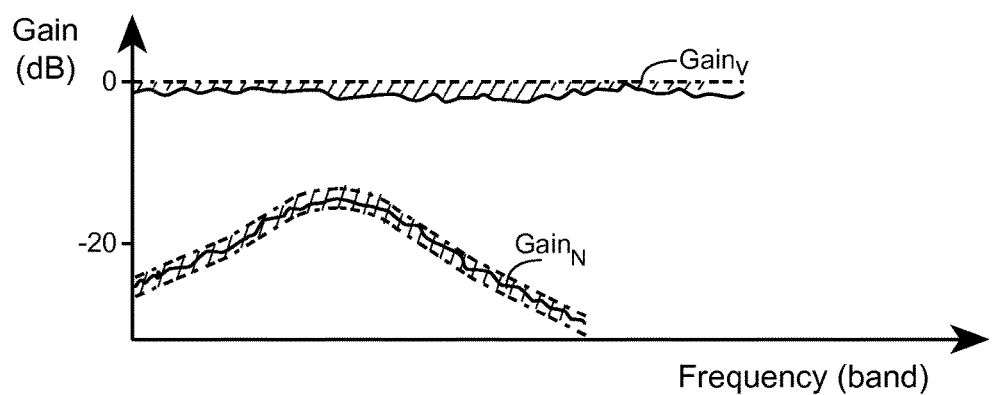

FIG. 7 is a set of two graphs. In the upper graph, the curve labeled "Voice" is a power spectrum of typical speech captured during a telephone conference; the "Noise" curve is a power spectrum of typical background noise captured during the conference; and the "Target" curve is a target power spectrum.

In the lower graph, the solid curve labeled "$Gain_N$" indicates an example set of gain suppression values (plotted as a function of frequency band) for modifying noise such as of the upper graph so that the modified noise has a power spectrum which matches the target spectrum of the upper graph, and the hatched area of $Gain_V$ indicates a range for such noise suppression gains.

Denote by $T_b'$ a target presence noise level, often of the order of −60 dB. Denote by $D_b'$ the maximum suppression depth (say typically between −30 and −40 dB). Again, S is the probability of voice or a monotonic function of the current probability of voice, as determined by a VAD, and denote by Gains the suppression gain to apply in a band. Note that all these quantities depend on frequency band b.

In one embodiment, there is a minimum gain (maximum suppression depth), such that $Gain_b' > Gain_{b,MIN}'$, and it is desired to maximize the gain Gains to suppress noise, such that noise estimate $N_b' \times Gain_b' \leq T_b'$. Additionally $Gain_b' \to 1$ as $S \to 1$.

In one embodiment, the gain variation with the VAD output is:

$$Gain_b' = Gain_{b,MIN}' + (1 - Gain_{b,MIN}')\left(\frac{T_b'}{N_b'}\right)^{1-S/2}, N_b' > T_b'$$

$$Gain_b' = 1, N_b' \leq T_b'.$$

If expressed in dB, the gain variation with the VAD output is:

$$Gain_{b_{dB}}' = (1-S)\max(Gain_{b,MIN_{dB}}', \min(0,(T_{b_{dB}}'-N_{b_{dB}}'))).$$

Hence, at times when there is no or low input energy in the spectra, thus indicative of only noise present, the resulting spectra of the suppressed signal will fall below the target level. In general, the target level is set to be in the vicinity of the final intended presence. In one embodiment, the residual noise level in the signal is set to match the target spectra noise level.

Note that a target level above the injected presence noise for any band will generally lead to some boosting when there is no signal, e.g., should the signal be completely gated off, while a target level below the presence noise for any band might involve a deeper average suppression, which could impact voice quality, even though using such a target level might better reduce or eliminate the perception of the background noise in the signal.

Some embodiments of the sending endpoints include such endpoints modifying noise spectra, during times of no voice, to have a common target, such the noise-only signals sent by different endpoints are consistent. A receiving endpoint embodiment of the invention is configured to the generate presence noise and add the presence noise to received signals. There is little benefit of boosting any residual noise that falls below the desired target, and it can be a risk given that low-level noise could be amplified. Thus, in conference systems that have endpoints that, in accordance with an aspect if the invention, add known comfort noise, some endpoint embodiments of the invention use knowledge that voice audio and known comfort noise will always be heard together at listening endpoints. In particular, such sending endpoints use the knowledge to improve and even optimize their respective input audio processing. In many cases, knowing that comfort noise having known target spectral property will be included at the receiving endpoint leads to the sending endpoint (that typically also is configured to add such noise when receiving) using a lower amount of suppression of unwanted noise than would otherwise be applied.

Spectral and Spatial Guidance

It is particularly useful to have at a receiving endpoint additional data about the sending endpoint (and its environment) that can be used to achieve the spectral properties and spatial properties typical of comfort noise, e.g., using filters 511, 512, 513 and a spatial warping matrix (element 521). This is applicable, e.g., for the case of the original room of the capturing endpoint being high in noise (after suppression) and/or the noise being very different in spatial or spectral characteristic than typical presence noise.

Some embodiments of the invention include adapting the spatial properties of the generated comfort noise to the properties of the different conference rooms and of the captured soundfields. One aspect is configuring the spatial properties of the generated presence noise to be at least a reasonable match to the different rooms and soundfields that may be present in the intended conference endpoint activity being captured. That is, considering again FIG. 1, one embodiment of the endpoint 111 is configured to modify the spatial properties of the generated presence noise to match the typically different respective spatial properties of the voice signals captured at, and sent from the other endpoints 105, 107, and 109 that send voice to endpoint 111.

Some embodiments of a receiving endpoint use information indicative of at least one spatial property of the signals captured at a sending endpoint, e.g., spectral statistical information about the soundfield being captured, e.g., properties of the WXY covariance matrix associated with sending endpoints, such data about the soundfield sent by the sending endpoint, or determined at the receiving endpoint. In one such endpoint embodiment, the generating and rendering of the spatial presence noise uses such data about the soundfield that is at the sending endpoint. Different embodiments of the invention include different methods of achieving this.

As a first such method, receiving endpoints monitor soundfields captured at sending endpoints. Such embodiments of the invention include the sending endpoint's determining the banded covariance matrix of the WXY (or similar) soundfield components. An embodiment of the receiving endpoint 111 is configured to monitor the respective spatial properties, e.g., to determine covariance matrices of respective WXY streams for a set of frequency bands from sending endpoints when such endpoints are active, and is further configured to store a set of covariance matrices, e.g., to store at least one for each known sending endpoint. Thus, one embodiment of the receiving endpoint 111 includes the receiving endpoint carrying out some processing, for example, carrying out soundfield noise statistical analysis to generate data usable to generate spatial comfort noise. Note that such processing is typically included in the input processing of the receiving endpoint, e.g., for suppression when such an endpoint is sending conference data, and the means for such processing can be used on received data to generate the spatial comfort noise.

A second method of using spatial information captured at the sending endpoint includes the sending endpoint sending such information and the receiving endpoint receiving the information. As described above in the subsection titled "The Send-Side Output Processing of an Example Endpoint" and elsewhere, a sending endpoint may include determining an estimate of noise levels. Some embodiments of a sending endpoint further include determining spatial properties, e.g., estimates of the covariance matrix statistics, including at least estimates of the covariance cross terms across the spectra. A typical endpoint may determine such information regardless of whether it is transmitting or not, e.g., may determine the covariance matrix of the inputs when a VAD indicates the input is not voice, i.e., is noise. As described above, one embodiment of the processing in a sending endpoint includes spatial warping such that at least one spatial property, e.g., the covariance matrix, matches at least one target spatial property, e.g., a target covariance matrix. One embodiment of the invention includes the sending endpoint sending at least one spectral spatial property from time to time, e.g., at a relatively low rate, in one version during transmission bursts, and in another, as an alternate or additionally, at a low rate along with the sending endpoint's normal data.

One such embodiment includes the sending endpoint compressing the spectral and spatial properties data to reduce the data rate, e.g., by sending coarse spectral data, of the order of 1-1.5 octave resolution.

One embodiment of a transmitting endpoint determines, as part of the transmit side processing, a secondary bitstream format (e.g., using packets that are small relative to regular coded audio packets) and includes in such a secondary bitstream spectral shape data and other properties of the comfort noise to be generated. The secondary bitstream may be multiplexed with the bitstream of the regular audio data to form a multiplexed bitstream which is sent to the server via the network.

Another embodiment of the sending endpoint includes the sending endpoint sending the secondary bitstream as a separate channel which is updated less frequently than the time-frame rate.

In some embodiments, the spectral and spatial properties data are packaged as one of the fields of a layered coding method that codes layers of information (fields) and sends the layers to the receiving endpoint 111, e.g., as a multiplexed bitstream of the layers. A receiving endpoint, e.g., endpoint 111 uses the information in the one or more additional layers to guide the spatial comfort noise. It is known that a sending endpoint may be configured to determine from a plurality of captured audio signals, multiple layers for sending, to encode such a plurality of layers into a bitstream, and to send such a bitstream. One layer comprises monophonic (mono) information sufficient to reconstruct a mono audio signal representative of the captured audio signals. One or more additional layers are provided for sending (and receiving) spatial information and other information, such as a noise estimate, masking curves, VAD values for each band, and/or one or more gains that achieve desired suppression, and/or associated masking curves. Examples of such spatial information include banded covariance matrix data determined by estimating the covariance of the input signals. In one version, an additional layer includes identifying and other information about the sending endpoint, although endpoint-identifying information may also be derivable at a receiving server, and sent to the receiving endpoints. A receiving endpoint thus receives information sufficient to determine at least one spatial property of the captured input signals from respective endpoints, and sufficient to spatially render the signal from a particular endpoint to have a desired spatial property, e.g., a desired location or direction.

A third method of the sending endpoint providing data to guide the generating of the comfort noise at the receiving endpoint is for the receiving endpoint to use masking curves associated with noise, and other noise details that typically are embedded in any coding stream. For example, a stream that is sent when there is no voice activity contains noise that contains spectral information that, in one embodiment, is used to shape the spatial presence noise rendered at the receiving endpoint 111.

Temporal Structure of Comfort Noise

The above-described embodiments of the present invention use an underlying stationary noise process to generate comfort noise. It is known that typical room noise (and typical environmental noise) has some temporal structure. Some embodiments of the invention further, or as an alternative, include generating noise that has a temporal structure typical of comfort noise.

One embodiment of an endpoint 111 that includes incorporating temporal structure comprises using, for the generated comfort noise, a pre-stored portion of typical room noise that was pre-recorded or sampled, and, in one version, that repeats, i.e., that is looped.

Another embodiment of an endpoint 111 that includes incorporating temporal structure comprises using higher order statistics and generating amplitude modulation by an excitation envelope across all or some of the spectra. To carry this out, one embodiment uses knowledge of the temporal structure across frequency for typical room noise. Generally, the times involved at higher frequencies are relatively small, such that the higher frequency modeling needs modeling of around three to four bands.

In one embodiment, generating the envelope excitation uses fractal excitation. It is known that many natural phenomena have a fractal (also called self-similar) property with respect to time, that is, they are scale invariant in that their phenomena appear the same for any choice of time unit. So called 1/f noise appears the same for any choice of time unit. For this reason, it has been widely considered a prominent manifestation of the fractal character of many natural phenomena. The self-similar temporal nature of processes like natural noise is well known. See, for example, R. F. Voss and J. Clarke, "1/f Noise in Music," Journal of the Acoustical Society of America, Vol. 63, pp. 258-263, January 1978.

One embodiment uses fractal excitation comprising 1/f noise created using random noise generators. Another embodiment uses fractal excitation comprising 1/f noise created using a deterministic function. One such method uses a finite difference equation, e.g., as proposed in I. Procaccia and H. G. Schuster, "Functional Renormalisation Group Theory of Universal 1/f Noise in Dynamical Systems," Phys Rev 28 A, 1210-pp. 1212 (1983). See also H. G. Schuster and W. Just, *Deterministic Chaos—An Introduction* (*4th Edition*), WILEY-VCH Verlag, Weinheim, Germany, 2005. One embodiment of the 1/f noise generating equation generates binary noise samples $\{x_t\}$ the finite difference equation:

$$x_t = [x_{t-1} + (x_{t-1})^2] \mod 1.$$

One embodiment of endpoint 111 further includes appropriate filtering of the envelope excitation to ensure it is consistent with what would be reasonable in a given room. In one embodiment, the envelope is filtered by a fast-attack and slow-decay peak tracker, e.g., a first order maximum following filter (or first order geometric decay filter) to catch the fast attack while limiting the speed of decay to match typical reverberant characteristics of a room.

Integration with a Transform Domain Noise Generation Codec

It is common for sending endpoints to increase coding efficiency by stopping or reducing data transmission during times when there is no active speech present, and to use a discontinuous transmission indicator (e.g., DTX) to indicate to the receiving endpoint that there is a discontinuity. The decoder part of typical codecs at endpoints are configured to receive such coded data, including DTX, to detect the DTX, and to add "fill-noise" for silence periods in such a stream, the fill noise typically generated using a decoder random noise generator.

One aspect of the invention is to modify a codec and to use the fill noise typically generated in the decoder side of a codec to efficiently generate comfort noise having spectral and spatial property typical of comfort noise, and to add such comfort noise to the decoded data. In one embodiment of the conference system of FIG. 1, no DTX is sent, while in another DTXs are sent. According to an aspect of the present invention, in addition to fill noise in the case that DTX is included, the receiving endpoint 111 always adds comfort noise to the stream, whether noise is present or not.

Figure 8:
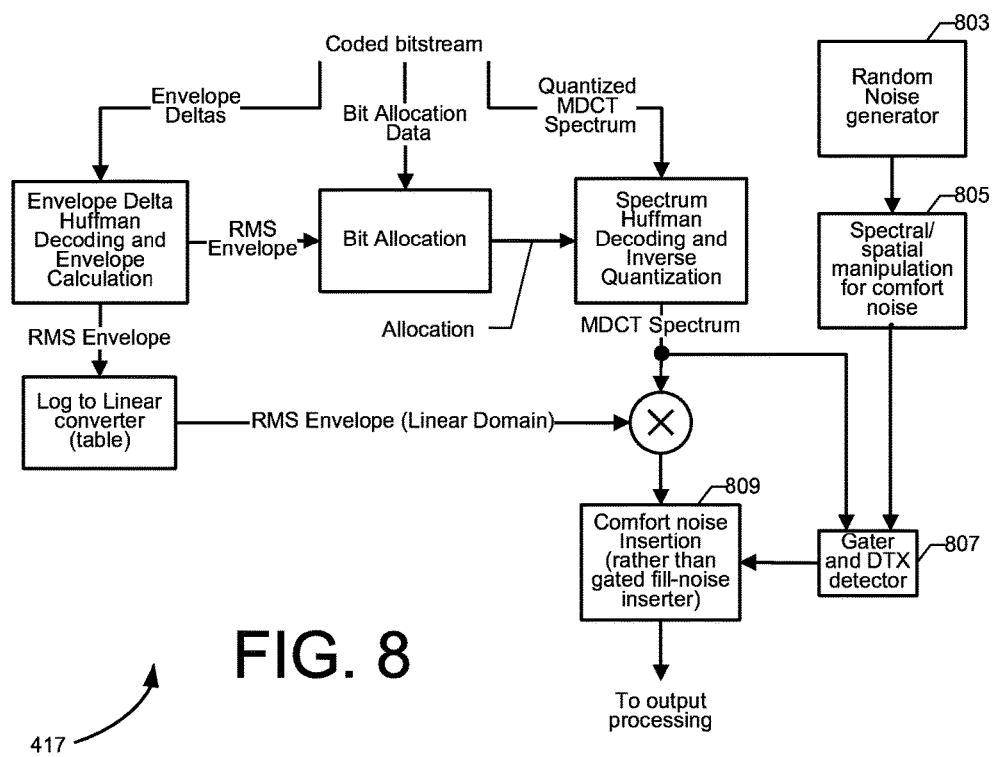
FIG. 8 shows a block diagram of one embodiment of a frequency-domain decoder that is configured to match a version of the encoder of FIG. 4.

FIG. 8 shows a block diagram of one embodiment of a MDCT-domain decoder 417 that is configured to match the MDCT-domain encoder of FIG. 5. This decoder can be implemented by simple modifications to a typical MDCT-domain decoder that matches the encoder of FIG. 5. Such a typical MDCT-domain decoder includes a gater, a DTX detector and a random noise generator that are configured to cooperate to add fill-in noise, e.g., upon detecting DTX, or when the quantized coefficients are zero, or upon encountering zero-valued quantized MDCT coefficients. Random numbers generated by the random noise generator are multiplied by a noise level parameter, e.g., from a stored table. The inventive decoder of FIG. 8 uses a random noise generator included in the typical decoder, for the random noise generators of the schematic shown in FIG. 5. The decoder of FIG. 8 uses the same strategy as a typical decoder, but for both zero and non-zero coefficients. A gater and DTX detector 807 is a modification of the gater and DTX detector of the typical decoder, and accepts comfort noise that has spectral characteristics and, in one embodiment, spatial characteristics typical of comfort noise, and that is a modification of the noise generated by generator 803. The modification is carried out by a spectral/spatial modification stage 805. The gater and DTX detector 807 is configured to cooperate with a comfort noise insertion stage 809 to add comfort noise to the decoded signal at all times, and further, to insert comfort noise at periods of silence and/or in DTX times. In one embodiment, the resulting MDCT coefficients are formed as the product of the reconstructed coefficient obtained and the envelope.

In one embodiment, the decoder is configured to have a relatively slowly changing envelope. In one embodiment, simple smoothing is applied, e.g., smoothing with a single time constant settable with a parameter value.

Thus, the codec of the endpoint 111 provides a mechanism to control the coarse spectral shape of a signal (exponent encoding), and further provides a source for generating random transform domain stimuli for use to fill in signal components below the coding noise threshold, and further to generate comfort noise.

In one implementation, the presence noise is assumed to have components, e.g., WXY components that are uncorrelated, i.e., that have a diagonal covariance matrix, e.g., in the case of the components being identically distributed, that have a covariance matrix that is a scaled identity matrix I.

One embodiment uses noise samples generated from a single channel codec and applies delays and permutations to create a spatially diverse sound suitable for generating comfort noise.

Packet Loss Concealment

One embodiment of the decoder in the endpoint 111 includes, as is typical of voice codecs, packet loss concealment. One embodiment of the endpoint 111 explicitly distinguishes between DTX and packet loss conditions. Furthermore, in one embodiment, the comfort noise generation is used for packet loss concealment in one or more predefined packet loss conditions. In one embodiment, comfort noise generation is used for packet loss concealment in the case of long bursts of packet loss.

An Example Decode and Scene Control Subsystem

Figure 9:
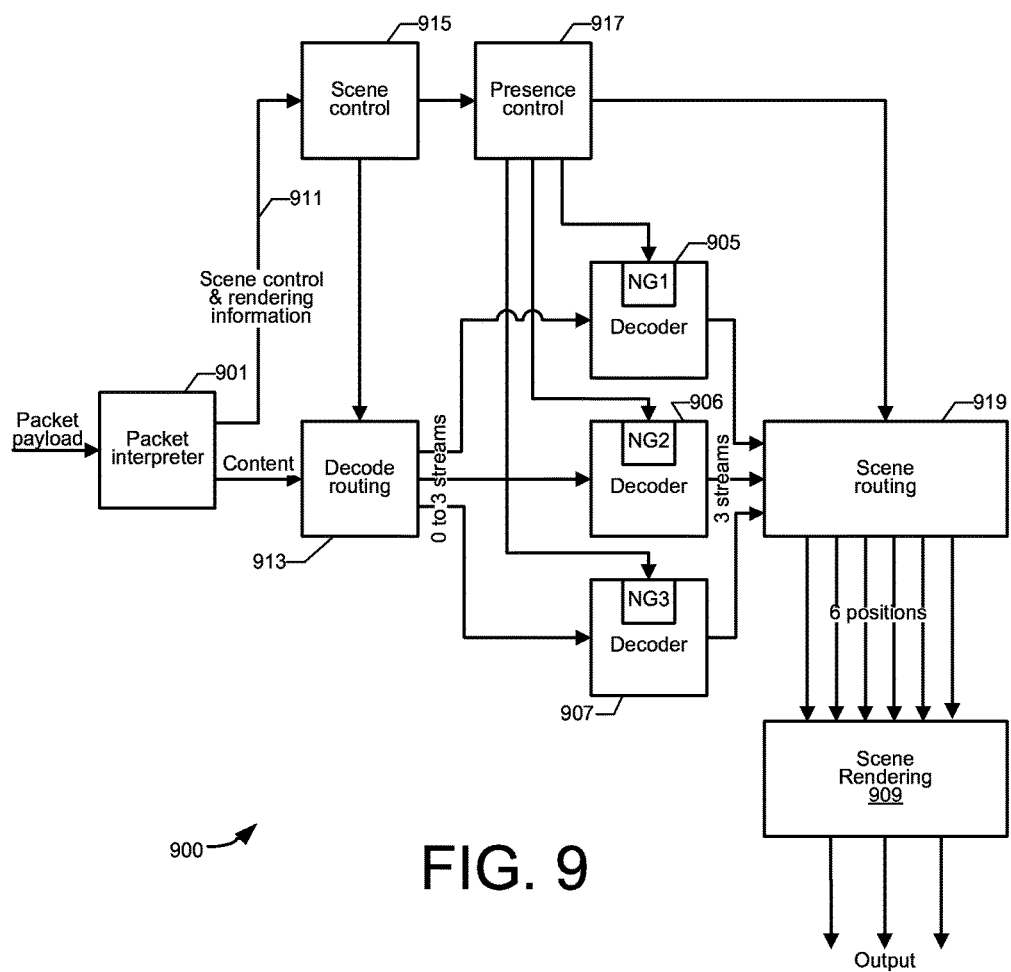
FIG. 9 shows a simplified block diagram of one embodiment of a bitstream decode and scene control element.

FIG. 9 shows a simplified block diagram of one embodiment of a bitstream decode and scene control subsystem 900 that is part of an alternate embodiment of an endpoint in an embodiment of the conference system in which data is received at the endpoint in a plurality of coded data streams. Such an endpoint includes more processing stages than are described in the block diagrams of FIGS. 1, 3, 4, 5, and 8, the description thereof. The processing further may be differently partitioned into processing stages than in such block diagrams. Bitstream decode and scene control subsystem 900 is configured to accept a plurality of coded data streams, in the contents (payload) of packets that arrive at the network interface. The packet payload includes conference data received from the conference server 101 via the network 103 from one or more endpoints, with a plurality of endpoints being able to be active participants at any time. The conference data of the packet payload is arranged as a plurality of coded data streams representing the audio from sending endpoints. The coded data streams include coded monophonic audio data from one or more endpoints, typically a plurality of sending endpoints, and further include spatial and control information for rendering the audio data of the streams.

One aspect of an embodiment of the conferencing system of FIG. 1 includes limiting the conference audio data that arrive at any endpoint at any point in time to a maximum number denoted $N_{max}$ of coded data streams. In one embodiment of a system, $N_{max}=3$, so there is a maximum number of three incoming coded data streams arriving at an endpoint at any point in time. Alternate embodiments limit the number of coded data streams to a different value of $N_{max}$.

Denote by $N_S$ the number of audio data streams simultaneously active in the packet data received at an endpoint. Another aspect of such a conference system embodiment includes providing for $N_S$ to be greater than $N_{max}$, such that more endpoint audio data streams can be simultaneously active than the maximum number $N_{max}$. Denote the maximum number of simultaneously active audio data streams as $N_{S,max}$. In one embodiment, $N_{S,max} > N_{S,max}$, e.g., $N_{max}=3$, $N_{S,max}=6$. In such an embodiment, the server 101 is configured to arrange the $N_S$ coded active streams and spatial information therefore into the coded data streams, such that no more than $N_{max}$ coded streams are sent to any one endpoint. In one example, the $N_S$ active streams are multiplexed into $N_{max}$ streams, together with scene control and rendering information 911 sufficient to enable a receiving endpoint to decode and demultiplex the received coded data streams into a stream containing the $N_S$ decoded audio streams, and provide scene control and rendering information to render the $N_S$ decoded audio streams. The rendering imparts particular respective spatial properties to the $N_S$ demultiplexed decoded streams, e.g., by moving and reassigning one or the other of the $N_S$ decoded audio streams to $N_S$ spatial positions using an output renderer 909. In one embodiment, the scene control and rendering information 911 includes other information, such as VAD values.

The output renderer 909 is configured to render each of the $N_S$ streams to $N_S$ points of a set of fixed points. Other embodiments additionally, or as an alternative, use a parameter that affects the rendering of each stream by renderer 909, e.g. to impart a different direction of arrival to each of the $N_S$ streams.

One embodiment of decode/scene control subsystem 900 includes a set of $N_{max}$ codecs that include $N_{max}$ respective decoding stages 905, 906, 907. As is common, each respective decoding stage 905, 906, 907 includes a respective random noise generator NG1, NG2, NG3. Such noise generators are commonly used for fill-noise during times of silence and/or upon receipt of appropriate DTX data, and are used, according to an embodiment of the present invention, for comfort noise generation.

Embodiments of the decode/scene control subsystem 900 are configured to add spatial comfort noise to the streams, such spatial comfort noise spatially rendered together with the audio of the $N_S$ received streams. Thus spatial comfort noise is added to the decoded voice data of a stream, both if such voice is present, and also in the absence of any incoming voice activity.

Some embodiments use the system shown in FIG. 4 and described herein above that includes separate random noise generators. One embodiment of subsystem 900 uses the random noise generators NG1, NG2, NG3 included in decoding stages 905, 906, 907.

One embodiment of the decode/scene control subsystem 900 includes a packet interpreter 901 to interpret the incoming packet payload and to separate the payload into a) content information that, in one embodiment, includes $N_{max}$ streams of coded data for $N_S$ audio streams, and b) scene control and rendering information 911 that provides spatial information and control for rendering the audio of the $N_S$ audio streams, and that may include other information needed for the functions carried out by subsystem 900.

One embodiment assumes and provides for a fixed number $N_{S,max}$ of included audio streams encoded into the $N_{max}$ coded data streams in the packet payload.

A decode routing stage 913 accepts the content information and, responsive to the scene control and rendering information 911, in particular, responsive to a scene control signal that is generated by a scene control stage 915 from the scene control and rendering information 911, assigns the data to the $N_{max}$ available decoders 905, 906, 907, feeding the decoders with respective spectral information applicable to each of the $N_{S,max}$ included streams. The scene control stage 915 further feeds spatial information and control information, and in some versions, other information, e.g., VAD control information to a presence controller 917 that generates presence-control signals for the generating and adding of the comfort noise. Each of the $N_{max}$ decoders 905, 906, 907 decodes each of the $N_{max}$ coded streams and, in accordance with an aspect of the invention, and in response to the presence-control signals, generates and continuously adds the desired comfort noise as described hereinabove, e.g., in FIG. 8 and the description thereof. The presence controller 917 further generates spatial information and presence control signals for a scene routing stage 919 that is configured to accept the $N_{max}$ (e.g., 3) decoded data streams with comfort noise data added, and to generate audio that includes the $N_{S,max}$ (e.g., 6) audio stream signals (with comfort noise). Scene routing stage 919 also generates $N_{S,max}$ time-varying scene-routing data for the output audio determined from the spatial information and presence control signals. The audio of the $N_{S,max}$ signals and the spatial information and presence control are accepted by scene renderer 909 to provide a set of decoded signals having $N_S$ spatial positions and comfort noise having a target spectrum and target spatial property, including $N_S$ spatial positions for a listener.

In one embodiment, the output of scene renderer 909 is in a three-signal soundfield format. The format may be WXY, LRS, three-dimensional B-format WXY, a binaural representation, 5.1 surround sound, or any other spatial representation known to those skilled in the art.

Note that in some embodiments, when the spatial presence noise to be added or injected from a codec-included noise generator exceeds the component that would have been generated normally by the codec, the audio signal or additional noise indicated by the codec can be deemed to be masked and not rendered.

Additionally, in some cases the rendering component will be required to handle an incoming soundfield (e.g., WXY). In some embodiments, this may involve the decoding of three audio channels, and therefore three instances of the final transform engine.

A Processing System Embodiment

Figure 10:
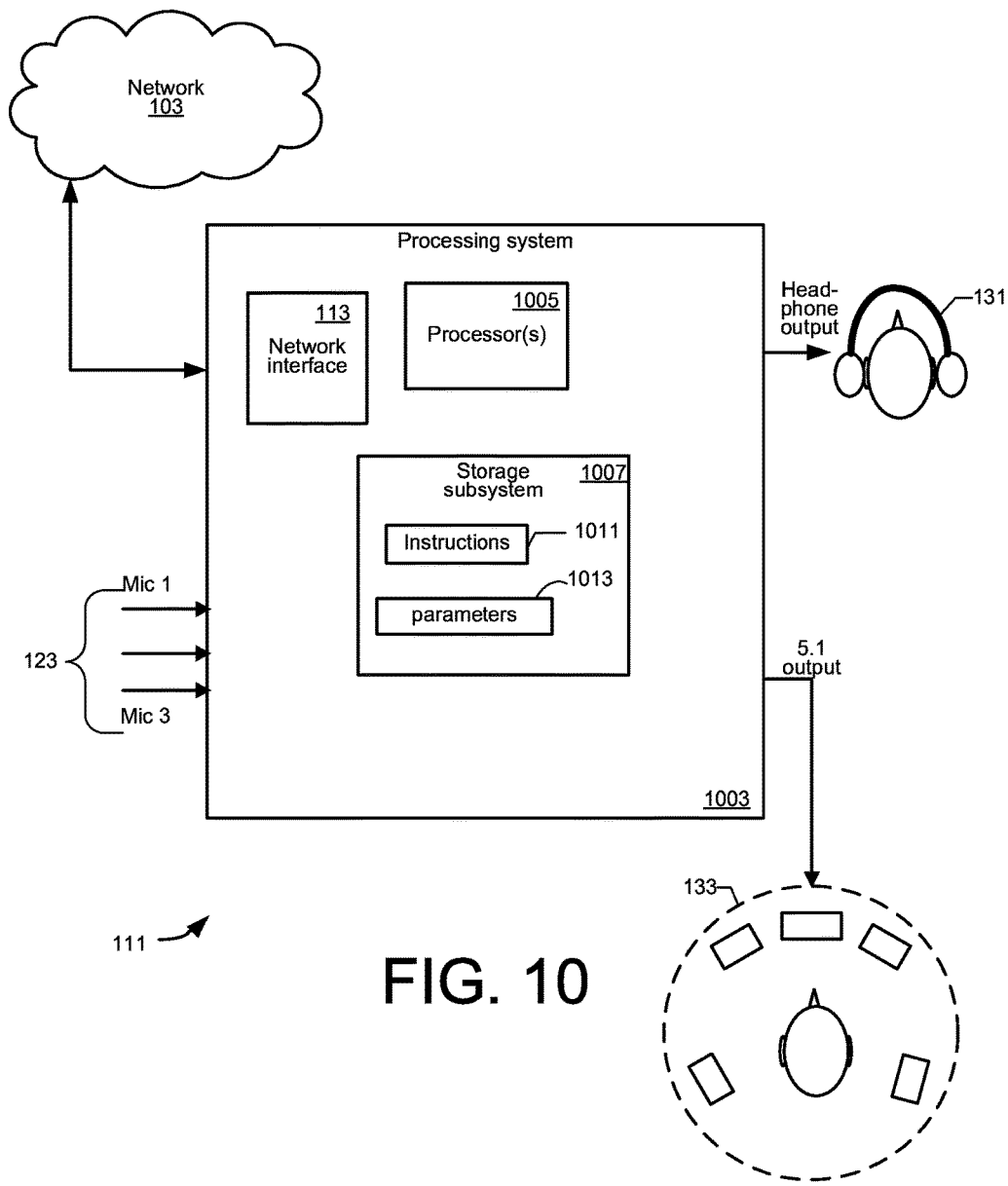
FIG. 10 shows a simplified block diagram of one embodiment of the endpoint of FIG. 1 that, in this version, includes a processing system.

FIG. 10 shows a simplified block diagram of one embodiment 1003 of the endpoint 111 of FIG. 1 that, in this version, includes an audio processing system at the receive side for carrying out the digital processes of endpoint 111. Such processing includes the input side processing of audio input signals from microphones 123 and the output side processing to generate one or more of headphone signals and surround side or other soundfield format speaker signals. Processing system 1003 includes analog-to-digital converters (not shown) that include quantizer(s) to digitize the audio input signals, digital to analog converters (also not shown) to generate a set of audio outputs, and at least one processor 1005. The processing system 1003 also includes a a storage subsystem 1007 that typically comprises one or more memory elements. The processing system 1003 also includes the network interface 113 configured to couple the processing system 1003 to a network, shown as packet network 103. In alternate versions, the network interface is a separate component. The elements of the processing system 1003 are coupled, e.g., by a bus subsystem or some other interconnection mechanism not shown in FIG. 10. Some of the elements of processing system 1003 may be integrated into a single circuit, using techniques commonly known to one skilled in the art.

The storage subsystem 1007 includes software with instructions 1011 that when executed by the processor(s) 1005, cause carrying out of the endpoint methods described herein. In particular, the respective processes carried out by input processing stage 125, network interface 113, spatial comfort noise generator 119, and output processing stage 117. Different versions of the instructions may carry out different method embodiments described herein, including variations described herein.

Note that the version shown includes two sets of outputs, one for listening via headphones 131, and another for listening in a surround sound system having a set of speakers 133. Of course, different implementations may include one or the other set of outputs, or one or more different types of output.

In some embodiments, the storage subsystem 1007 is configured to store one or more parameters 1013, that can be used, for example, to vary some of the processing steps carried out by the processing system 1003, and that provide information for the processing stages. Such parameters may be settable, while others pre-defined.

On Notation, Nomenclature and Other Aspects

Throughout this disclosure, including in the claims, the terms "speech" and "voice" are used interchangeably in a broad sense to denote audio content perceived as a form of communication by a human being, or a signal (or data) indicative of such audio content. Thus, speech determined or indicated by an audio signal may be audio content of the signal which is perceived as a human utterance upon reproduction of the signal by a loudspeaker (or other sound-emitting transducer).

Throughout this disclosure, including in the claims, the term "noise" is used in a broad sense to denote audio content other than speech, or a signal (or data) indicative of such audio content (but not indicative of a significant level of speech). Thus, noise determined or indicated by an audio signal captured during a teleconference (or by data indicative of samples of such a signal) may be audio content of the signal which is not perceived as a human utterance upon reproduction of the signal by a loudspeaker (or other sound-emitting transducer).

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), all driven by a single, common speaker feed (the speaker feed may undergo different processing in different circuitry branches coupled to the different transducers).

Throughout this disclosure, including in the claims, each of the expressions "monophonic audio," "monophonic audio signal," "mono audio," and "mono audio signal," denotes an audio signal capable of being rendered to generate a single speaker feed for driving a single loudspeaker to emit sound perceivable by a listener as emanating from one or more sources, but not to emit sound perceivable by a listener as originating at an apparent source location (or two or more apparent source locations) distinct from the loudspeaker's actual location.

Throughout this disclosure, including in the claims, the expression "performing an operation on a signal or data" or the like (e.g., filtering, scaling, transforming, or applying gain to the signal or data) is used in a broad sense to denote performing the operation directly on the signal or data in the same, e.g., a time- or a transform-domain, or in a different, e.g., a transform- or a time-domain, or on a processed version of the signal or data, e.g., on a version of the signal that has undergone preliminary filtering or pre-processing prior to the performance of the operation thereon.

Throughout this disclosure including in the claims, the expression "system" is used in a broad sense to denote an apparatus, device, system, subsystem, module, or stage of an apparatus. For example, a subsystem that implements a decoder may be referred to as a decoder system, and a system including such a subsystem, e.g., a system that generates a number of output signals in response to multiple inputs, in which the subsystem generates some of the inputs and the other inputs are received from an external source, may also be referred to as a decoder system.

In a similar manner, the term "processor" may refer to any device or portion of a device that performs operations on electronic data, e.g., from registers and/or memory, to transform that electronic data into other electronic data that, e.g., may be stored in registers and/or memory. In particular, a processor is used in a broad sense to denote a system or device programmable or otherwise configurable, e.g., with software or firmware, to perform operations on data such as audio, video or other image data, or combination of audio and video. A processor may include one or more of a field-programmable gate array or other configurable integrated circuit or chip set, a digital signal processor (DSP) programmable and/or otherwise configurable to perform processing, e.g., pipelined processing on data, e.g., audio or other sound data, a graphics processing unit (GPU), a central processing unit (CPU) of a programmable general purpose processor or computer, and a programmable microprocessor chip, portion of a chip, or chip set.

Note that when a method is described that includes several elements, e.g., several steps, no ordering of such elements, e.g., of such steps, is implied, unless specifically stated.

The phrase "configured to" carry out a step is used synonymously with the phrase "operative to" carry out the step, and means that the elements are designed to carry out the step when operating.

The methodologies described are, in some embodiments, performable by one or more processors that accept logic, e.g., instructions encoded on one or more computer-readable media. When executed by one or more of the processors, the instructions cause carrying out of at least one of the methods described herein.

A processing system or computer or a computing machine or a computing platform (in general, a processing system) may include one or more processors. A processing system further includes a storage subsystem with at least one storage medium, which may include memory embedded in a semiconductor device, or a separate memory subsystem including main RAM and/or a static RAM, and/or ROM, and also cache memory. The storage subsystem may further include one or more other storage devices, such as magnetic and/or optical and/or further solid state storage devices. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD), organic light emitting display (OLED), or a cathode ray tube (CRT) display. If manual data entry is required, the processing system also includes an input device such as one or more of an alphanumeric input unit such as a keyboard, a pointing control device such as a mouse, and so forth. The terms "storage device," "storage subsystem" or "memory unit" as used herein, if clear from the context and unless explicitly stated otherwise, also encompass a storage system such as a disk drive unit. The processing system in some configurations may include a sound input transducer, such as one or more microphones, a sound output device, and a network interface device.

In some embodiments, a non-transitory computer-readable medium is configured with, e.g., encoded with, instructions, e.g., logic, that when executed by one or more processors of a processing system that includes at least one processor element and a storage subsystem, cause carrying out a method as described herein. Some embodiments are in the form of the logic itself.

A non-transitory computer-readable medium is any computer-readable medium that is statutory subject matter under the patent laws applicable to this disclosure, including Section 101 of Title 35 of the United States Code. A non-transitory computer-readable medium is, for example, any computer-readable medium that is not specifically a transitory propagated signal or a transitory carrier wave or some other transitory transmission medium. The term non-transitory computer-readable medium thus covers any tangible computer-readable storage medium. Such media may take many forms including, for example, one or more of static memory ("static RAM"), dynamic memory ("dynamic RAM") such as main memory in a processing system, optical disks, magnetic disks, and magneto-optical disks.

In a typical processing system as described above, the storage subsystem thus includes a computer-readable storage medium that is configured with, e.g., encoded with, instructions, e.g., logic, e.g., software, that when executed by one or more processors, causes carrying out one or more of the method steps described herein. The software may reside in the hard disk, or may also reside, completely or at least partially, within the memory, e.g., RAM and/or within the processor registers during the execution thereof by the computer system. Thus, the memory and the processor registers also constitute a non-transitory computer-readable medium on which can be encoded instructions to cause, when executed, carrying out method steps.

While the computer-readable medium may be shown in an example embodiment to be a single medium, the term medium should be taken to include a single medium or multiple media (e.g., several memories, a centralized or distributed database, and/or associated caches and servers) that store one or more sets of instructions.

Furthermore, a non-transitory computer-readable medium, e.g., a computer-readable storage medium may form a computer program product, or be included in a computer program product.

In alternative embodiments, one or more processors operate as a stand-alone device, or the one or more processors may operate in the capacity of a server or a client machine, e.g., an endpoint as described herein, e.g., in a server-client network environment, or as a peer machine in a peer-to-peer or distributed network environment. The term "processing system" encompasses all such possibilities, unless explicitly excluded or otherwise defined herein. The one or more processors may form or be included in a personal computer (PC), a media playback device, a headset device, a hands-free communication device, a tablet PC, a set-top box (STB), a Personal Digital Assistant (PDA), a tablet, a game machine, a cellular telephone, a Web appliance, a network router, switch or bridge, an endpoint of a conference system, or any machine capable of executing a set of instructions (sequential or otherwise) that specify actions to be taken by that machine. What specific forms of a processing system are included and/or excluded may be clear from the context of this specification.

Note that while some diagram(s) only show(s) a single processor and a single storage subsystem, e.g., a single memory that stores the logic including instructions, those skilled in the art will understand that many of the components described above are included, but not explicitly shown or described in order not to obscure the inventive aspect. For example, while only a single machine is illustrated, the term machine shall also be taken to include any collection of machines that individually or jointly execute a set (or multiple sets) of instructions to perform any one or more of the methodologies discussed herein.

Thus, as will be appreciated by those skilled in the art, embodiments of the present invention may be embodied as a method, an apparatus such as a an endpoint of a conference system, an apparatus such as a data processing system, logic, e.g., embodied in a non-transitory computer-readable medium, or a non-transitory computer-readable medium that is encoded with instructions. Accordingly, aspects of the present invention may take the form of a method, an entirely hardware embodiment, an entirely software embodiment, or an embodiment combining software and hardware aspects. Furthermore, embodiments of the present invention may take the form of program logic, e.g., a computer program on a non-transitory computer-readable medium, or the non-transitory computer-readable medium configured with computer-readable program code, e.g., a computer program product.

It will also be understood that embodiments of the present invention are not limited to any particular implementation or programming technique and that the invention may be implemented using any appropriate techniques for implementing the functionality described herein. Furthermore, embodiments are not limited to any particular programming language or operating system or programming model.

Reference throughout this specification to "one embodiment," "an embodiment," "some embodiments," or "embodiments" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as one separate embodiment, or, in the case case of a multiply-dependent claim, as a plurality of separate embodiments of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives first, second, third, etc., to describe a common object, merely indicate that different instances of like objects are being referred to, and are not intended to imply that the objects so described must be in a given sequence, either temporally, spatially, in ranking, or in any other manner.

All U.S. patents, U.S. patent applications, and International (PCT) patent applications designating the United States cited herein are hereby incorporated by reference, except in those jurisdictions that do not permit incorporation by reference, in which case the Applicant reserves the right to insert any portion of or all such material into the specification by amendment without such insertion considered new matter. In case the Patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of other art in this specification should in no way be considered an admission that such art is widely known, is publicly known, or forms part of the general knowledge in the field at the time of invention.

In the claims below and the description herein, any one of the terms "comprising," "comprised of," or "which comprises" is an open term that means including at least the elements/features that follow, but not excluding others. Thus, the term "comprising," when used in the claims, should not be interpreted as being limited to the means or elements or steps listed thereafter. For example, the scope of the expression "a device comprising A and B" should not be limited to devices consisting of only elements A and B. Any one of the terms "including" or "which includes" or "that includes" as used herein is also an open term that also means including at least the elements/features that follow the term, but not excluding others. Thus, "including" is synonymous with and means comprising.

Similarly, it is to be noticed that the term "coupled", when used in the claims, should not be interpreted as being limited to direct connections only. The terms "coupled" and "connected," along with their derivatives, may be used. It should be understood that these terms are not intended as synonyms for each other, but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, "coupled to" does not imply direction. Hence, the expression "a device A is coupled to a device B" may be synonymous with the expression "a device B is coupled to a device A." "Coupled" may mean that two or more elements are either in direct physical or electrical contact, or that two or more elements are not in direct contact with each other, but yet still cooperate or interact with each other.

In addition, recitations of indefinite articles "a" or "an" or "some" are used to describe elements and components of the embodiments herein. This is done merely for convenience and to give a general sense of the invention. This description should be read to include one or at least one and the singular also includes the plural unless it is obvious that it is meant otherwise.

Thus, while there has been described what are believed to be the preferred embodiments of the invention, those skilled in the art will recognize that alternate embodiments of the invention may include modifications and other elements, and it is intended to claim all such modifications and other elements, to the extent permitted by law. For example, to the extent permitted by law: any formulas given above are merely representative of procedures that may be used; functionality may be added or deleted from the block diagrams and operations may be interchanged among functional blocks; and steps may be added to or deleted from methods described within the scope of the present invention.

We claim:

1. A method, in a receiving endpoint of a conference system, of providing spatial comfort noise, the method comprising:
   receiving one or more audio signals for rendering at the receiving endpoint over a network connection to a server;
   generating one or more noise signals;
   adjusting the one or more noise signals to modified noise signals that have target spectral characteristics typical of comfort noise;
   adjusting the modified noise signals to form a plurality of spatial comfort noise signals having at least one spatial property that at least substantially matches at least one target spatial property, the adjusting the modified noise signals comprising converting the one or more noise signals to a soundfield format;
   combining the received audio signals with the plurality of spatial comfort noise signals; and
   rendering the spatial comfort noise signals to a set of output signals for loudspeakers to be heard by one or more conferees at the receiving endpoint, wherein the rendering renders the combination of the received audio signals and the spatial comfort noise signals to the set of output signals for loudspeakers.

2. The method of claim 1,
   wherein the spatial comfort noise signals are continually in the output signal in addition to the output from the received audio signals, whether or not speech is present in the received one or more audio signals.

3. The method of claim 1, wherein the generating generates a plurality of noise signals, and wherein the adjusting the modified noise signals further comprises spatially modifying according to a linear mapping defined by a warping matrix.

4. The method of claim 1, wherein the generating of the one or more noise signals and the adjusting the modified noise signals uses a pre-stored portion of typical room noise that was pre-recorded or sampled.

5. A non-transitory computer-readable medium configured with instructions that when executed by one or more processors of a processing system included in a receiving endpoint of a conference system, carry out a method of providing spatial comfort noise, the method comprising:
   receiving one or more audio signals for rendering at the receiving endpoint over a network connection to a server;
   generating one or more noise signals;
   adjusting the one or more noise signals to modified noise signals that have target spectral characteristics typical of comfort noise;
   adjusting the modified noise signals to form a plurality of spatial comfort noise signals having at least one spatial property that at least substantially matches at least one target spatial property, the adjusting the modified noise signals comprising converting the one or more noise signals to a soundfield format;
   generating a combination of the plurality of spatial comfort noise signals and a plurality of audio signals received at the receiving endpoint from a sending endpoint;
   and
   rendering the combination of the received audio signals and the spatial comfort noise signals to a set of output signals for loudspeakers, wherein the rendering renders the combination of the received audio signals and the spatial comfort noise signals to the set of output signals for loudspeakers.

* * * * *